(12) United States Patent
Kim et al.

(10) Patent No.: US 9,154,205 B2
(45) Date of Patent: Oct. 6, 2015

(54) METHOD FOR DOWNLINK BEAMFORMING IN WIRELESS ACCESS SYSTEM AND DEVICE THEREFOR

(71) Applicant: LG ELECTRONICS INC., Seoul (KR)

(72) Inventors: Jinmin Kim, Anyang-si (KR); Sunam Kim, Anyang-si (KR); Binchul Ihm, Anyang-si (KR); Hyukmin Son, Anyang-si (KR); Changhwan Park, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/395,796

(22) PCT Filed: Apr. 15, 2013

(86) PCT No.: PCT/KR2013/003140
§ 371 (c)(1),
(2) Date: Oct. 20, 2014

(87) PCT Pub. No.: WO2013/157790
PCT Pub. Date: Oct. 24, 2013

(65) Prior Publication Data
US 2015/0092875 A1  Apr. 2, 2015

Related U.S. Application Data

(60) Provisional application No. 61/635,867, filed on Apr. 20, 2012.

(51) Int. Cl.
*H04B 7/04*  (2006.01)
*H04B 7/06*  (2006.01)
*H04W 72/04* (2009.01)

(52) U.S. Cl.
CPC .............. *H04B 7/046* (2013.01); *H04B 7/0452* (2013.01); *H04B 7/0456* (2013.01);
(Continued)

(58) Field of Classification Search
CPC .... H04B 7/046; H04B 7/0452; H04B 7/0626; H04W 72/0413
See application file for complete search history.

(56) References Cited

U.S. PATENT DOCUMENTS

2011/0205930 A1* 8/2011 Rahman et al. ................ 370/252
2013/0114656 A1* 5/2013 Sayana et al. ................. 375/219

FOREIGN PATENT DOCUMENTS

| KR | 10-2010-0023975 | 3/2010 |
| KR | 10-2010-0138261 | 12/2010 |
| KR | 10-2012-0015797 | 2/2012 |

(Continued)

OTHER PUBLICATIONS

PCT International Application No. PCT/KR2013/003140, Written Opinion of the International Searching Authority dated Jul. 18, 2013, 20 pages.

*Primary Examiner* — Leon Flores
(74) *Attorney, Agent, or Firm* — Lee, Hong, Degerman, Kang & Waimey

(57) ABSTRACT

A method for downlink beamforming in a wireless access system and a device therefor are disclosed. Specifically, the method comprises the following steps: transmitting, by an eNB, a reference signal to a UE through only a first antenna set from among whole antennas; receiving, by the eNB, channel state information (CSI) for the first antenna set from the UE; and transmitting, by the eNB, beamforming a downlink channel by using a precoding matrix for the whole antennas, wherein CSI for a second antenna set by which the reference signal has not been transmitted from among the whole antennas is calculated using the CSI for the first antenna set.

12 Claims, 18 Drawing Sheets

(52) U.S. Cl.
CPC ........... *H04B 7/0478* (2013.01); *H04B 7/0617* (2013.01); *H04B 7/0626* (2013.01); *H04B 7/0632* (2013.01); *H04B 7/0639* (2013.01); *H04B 7/0691* (2013.01); *H04W 72/0413* (2013.01)

(56) References Cited

FOREIGN PATENT DOCUMENTS

| | | |
|---|---|---|
| WO | 2010/107129 | 9/2010 |
| WO | 2010/120140 | 10/2010 |

* cited by examiner

METHOD FOR DOWNLINK BEAMFORMING IN WIRELESS ACCESS SYSTEM AND DEVICE THEREFOR

CROSS-REFERENCE TO RELATED APPLICATIONS

This application is the National Stage filing under 35 U.S.C. 371 of International Application No. PCT/KR2013/003140, filed on Apr. 15, 2013, which claims the benefit of U.S. Provisional Application Ser. No. 61/635,867, filed on Apr. 20, 2012, the contents of which are all hereby incorporated by reference herein in their entirety.

TECHNICAL FIELD

The present invention relates to a wireless access system, and more particularly, to a method of performing downlink beamforming in a wireless access system supporting massive multi-input multi-output and an apparatus therefor.

BACKGROUND ART

Recently, in order to improve link quality between a transmission end and a reception end and support high data transmission rate according to requirements of a next generation wireless access system, schemes utilizing multiple antennas are actively studying. Such schemes as SFBC (space frequency block coding), SM (spatial multiplexing), CL-MIMO (closed-loop MIMO/beamforming), ZFBF (zero-forcing beamforming) and the like are applied to LTE or LTE-A commercial system.

In general, due to a reason such as a physical space, power supply and the like, it is considered that more antennas are installed in an eNode B rather than a user equipment in a mobile communication system. According to a current LTE-A system (release-10), maximum 8 Tx systems are supported. Among the schemes improving the link quality using multiple antennas, if channel state information is usable by a transmission end, a beamforming scheme can provide best performance. According to the beamforming scheme, as the number of transmission antennas increases, a gain of transmit power saving or improved link quality can be obtained more. And, as the number of antennas increases, a sharp beam can be formed and may have more orthogonal beams at the same time. In particular, there may exist more reception ends capable of receiving data of each of the reception ends at the same time. To this end, a system, i.e., a massive MIMO system, capable of supporting a large-scale antenna more than legacy 8 Tx is considering.

DISCLOSURE OF THE INVENTION

Technical Task

A technical task of the present invention is to propose a method of smoothly performing downlink beamforming in a wireless access system, preferably, in a wireless access system supporting a massive MIMO system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing downlink beamforming in a wireless access system includes the steps of transmitting, by a base station, a reference signal to a user equipment via a first antenna set, receiving, by a base station, channel state information (CSI) on the first antenna set from the user equipment and transmitting, by a base station, a downlink channel to the user equipment in a manner of beamforming the downlink channel using a precoding matrix for the first antenna set and a second antenna set, wherein CSI on the second antenna set, which has not transmitted the reference signal, can be calculated using the CSI on the first antenna set.

To further achieve these and other advantages and in accordance with the purpose of the present invention, according to a different embodiment, a base station performing downlink beamforming in a wireless access system includes a radio frequency (RF) unit configured to transmit and receive a radio signal and a processor, the processor configured to transmit a reference signal to a user equipment via a first antenna set of the base station, the processor configured to receive channel state information (CSI) on the first antenna set from the user equipment, the processor configured to transmit a downlink channel to the user equipment in a manner of beamforming the downlink channel using a precoding matrix for the first antenna set and a second antenna set, wherein CSI on the second antenna set, which has not transmitted the reference signal, can be calculated using the CSI on the first antenna set.

Preferably, the CSI on the second antenna set can be calculated in a manner of applying an interpolation scheme or an MMSE (Minimum Mean Square Estimation) scheme to the CSI on the first antenna set.

Preferably, the CSI on the second antenna set can be calculated by the base station or the user equipment.

Preferably, the base station can receive a difference magnitude value and a difference angle value of a channel response between a random antenna among antennas belonging to the first antenna set and an antenna closest to the random antenna among antennas belonging to the first antenna set, from the user equipment.

Preferably, the CSI on the second antenna set can be calculated using the CSI on the first antenna set, the difference magnitude value and the difference angle value.

Preferably, the CSI can include at least one of CQI (Channel Quality Information) and PMI (Precoding Matrix Indication).

To further achieve these and other advantages and in accordance with the purpose of the present invention, according to a further different embodiment, a method of performing downlink beamforming in a wireless access system includes the steps of receiving, by a user equipment, a reference signal via a first antenna set of a base station, transmitting, by the user equipment, channel state information (CSI) on the first antenna set to the base station and receiving, by the user equipment, a downlink channel on which beamforming is performed using a precoding matrix for the first antenna set and a second antenna set from the base station, wherein CSI on the second antenna set, which has not transmitted the reference signal, is calculated using the CSI on the first antenna set.

To further achieve these and other advantages and in accordance with the purpose of the present invention, according to a further different embodiment, a user equipment supporting downlink beamforming of a base station in a wireless access system includes a radio frequency (RF) unit configured to transmit and receive a radio signal and a processor, the processor configured to receive a reference signal via a first antenna set of the base station, the processor configured to transmit channel state information (CSI) on the first antenna set to the base station, the processor configured to receive a downlink channel on which beamforming is performed using a precoding matrix for the first antenna set and a second antenna set from the base station, wherein CSI on the second antenna set, which has not transmitted the reference signal, can be calculated using the CSI on the first antenna set.

Preferably, the CSI on the second antenna set can be calculated in a manner of applying an interpolation scheme or an MMSE (Minimum Mean Square Estimation) scheme to the CSI on the first antenna set.

Preferably, the CSI on the second antenna set can be calculated by the base station or the user equipment.

Preferably, the user equipment can transmit a difference magnitude value and a difference angle value of a channel response between a random antenna among antennas belonging to the first antenna set and an antenna closest to the random antenna, to the base station.

Preferably, the CSI on the second antenna set can be calculated using the CSI on the first antenna set, the difference magnitude value and the difference angle value.

Preferably, the CSI includes at least one of CQI (Channel Quality Information) and PMI (Precoding Matrix Indication).

Advantageous Effects

According to embodiment of the present invention, it is able to smoothly perform downlink beamforming in a wireless access system, preferably, in a wireless access system supporting a massive MIMO system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
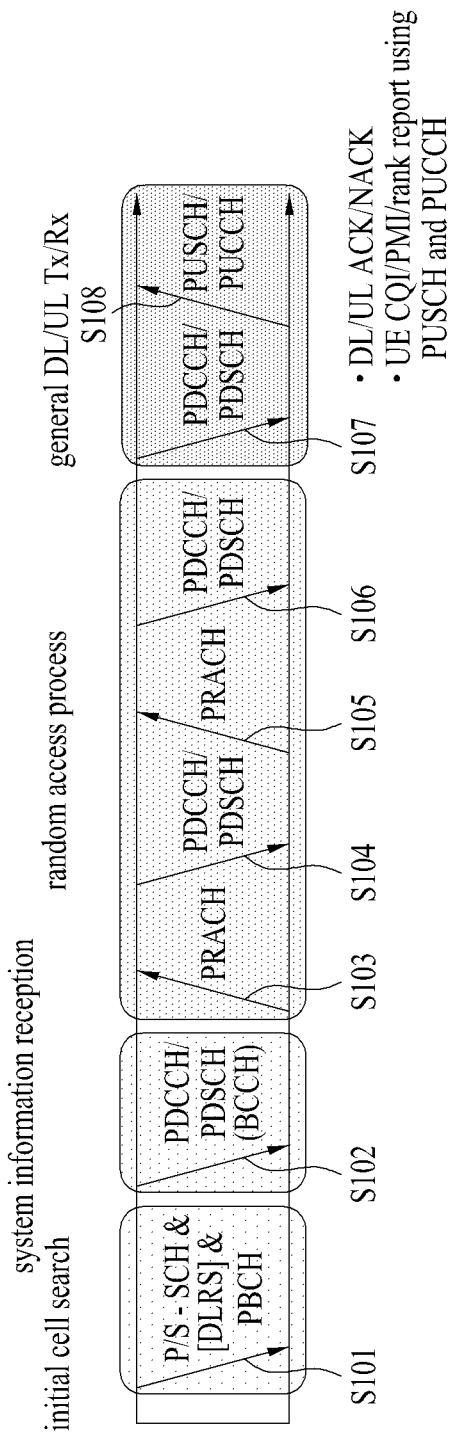
FIG. 1 is a diagram for explaining physical channels used for 3GPP LTE system and a general signal transmission method using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

Generals of 3GPP LTE/LTE-A System to which the Present Invention is Applicable

FIG. 1 is a diagram for explaining physical channels used for 3GPP LTE system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain more detailed system information [S102].

Meanwhile, the user equipment may be able to perform a random access procedure to complete the access to the base station [S103 to S106]. To this end, the user equipment may transmit a specific sequence as a preamble via a physical random access channel (PRACH) [S103] and may be then able to receive a response message via PDCCH and a corresponding PDSCH in response to the random access [S104]. In case of a contention based random access, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S108 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
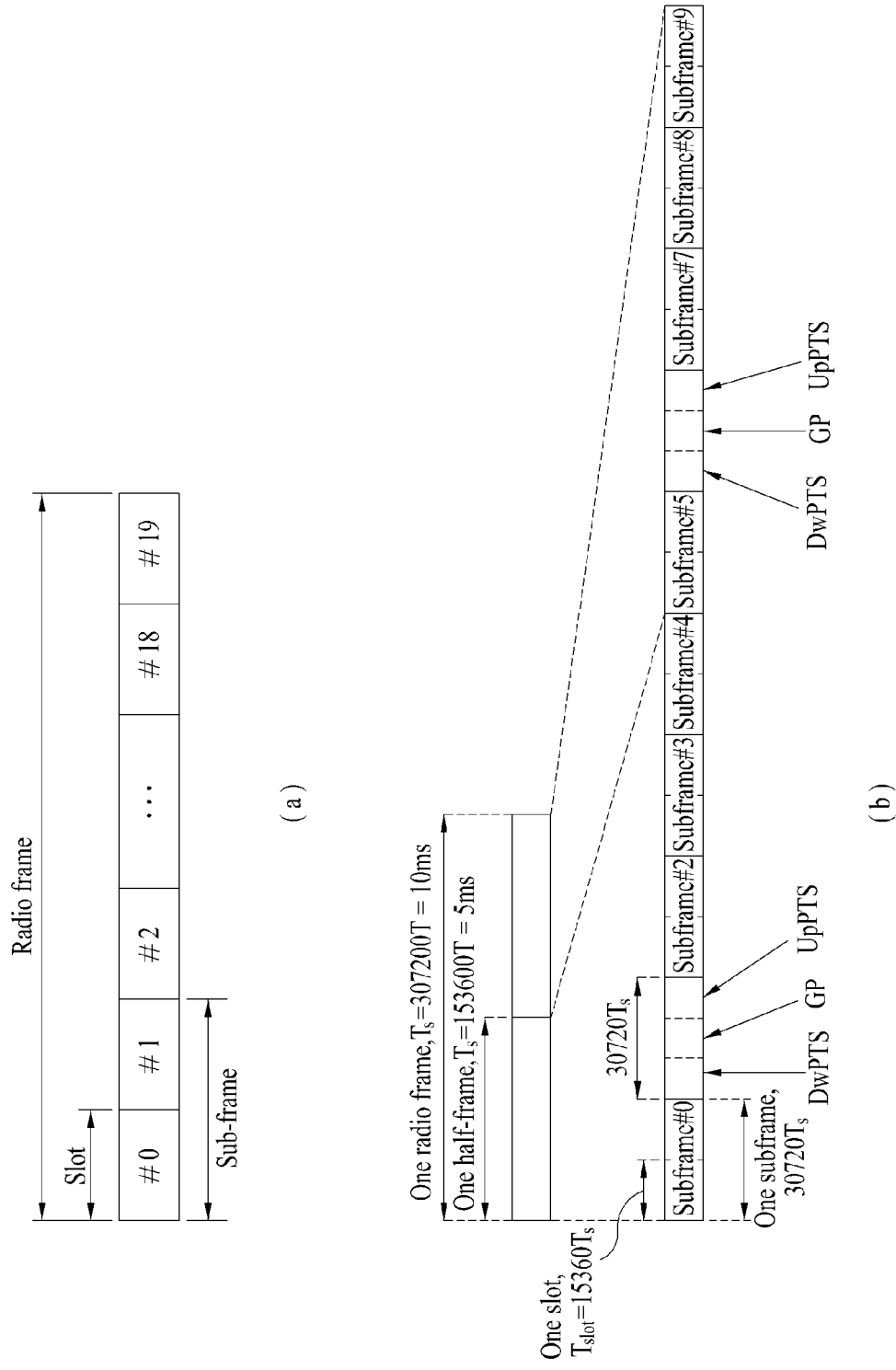
FIG. 2 is a diagram for a structure of a radio frame in 3GPP LTE.

FIG. 2 shows structures of radio frames in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a downlink radio frame of type 2. A type 2 radio frame includes 2 half frames. Each of the half frames includes 5 subframes, a DwPTS (downlink pilot time slot), a GP (guard period), and an UpPTS (uplink pilot time slot). Each of the subframes includes 2 slots. The DwPTS is used for initial cell search, synchronization, or channel estimation in a user equipment.

The UpPTS is used for channel estimation in a base station and matching a uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
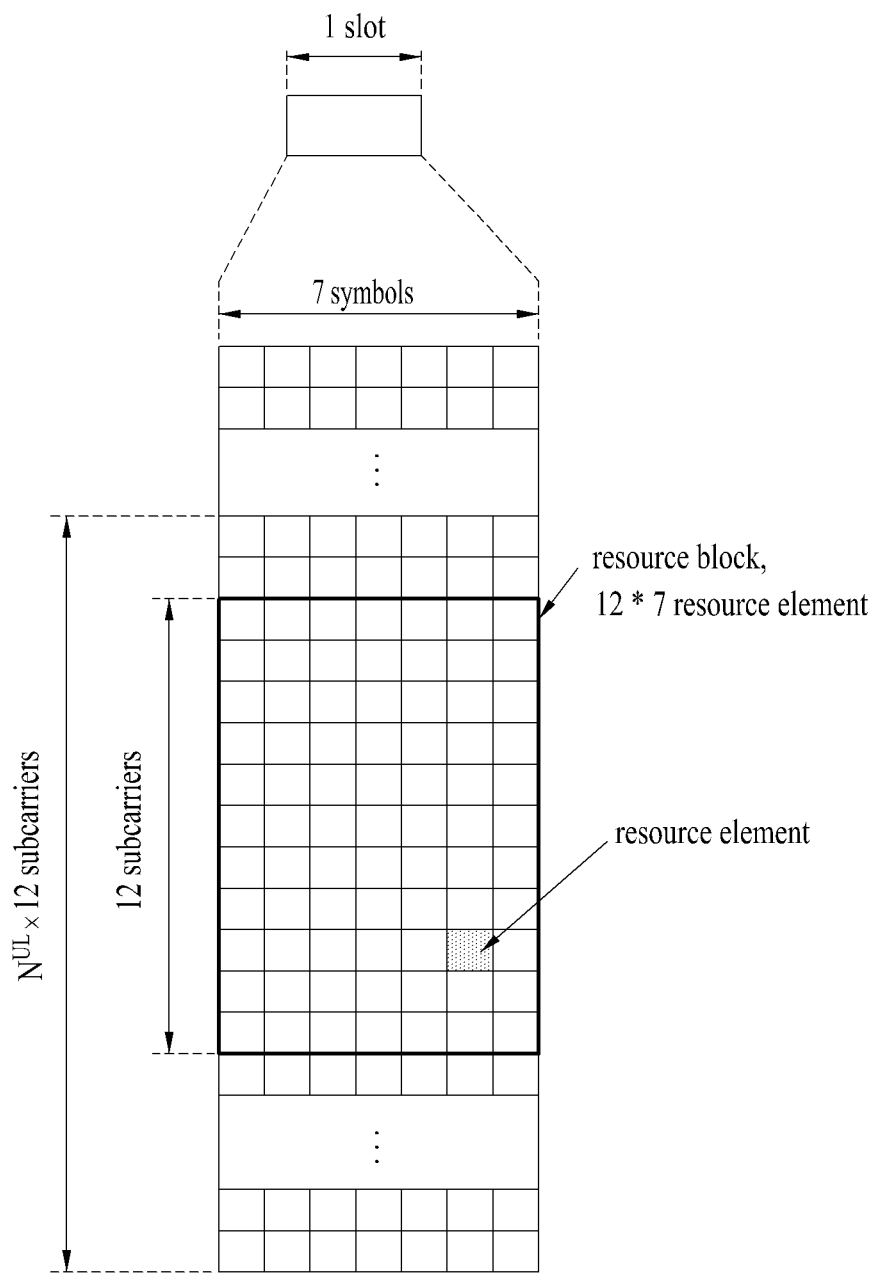
FIG. 3 is a diagram for one example of a resource grid for a downlink slot.

FIG. 3 is a diagram for an example of a resource grid for one downlink slot.

Referring to FIG. 3, one downlink slot includes a plurality of OFDM symbols in time domain. In this case, one downlink (DL) slot includes 7 OFDM symbols and one resource block (RB) includes 12 subcarriers in frequency domain, by which the present invention may be non-limited.

Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
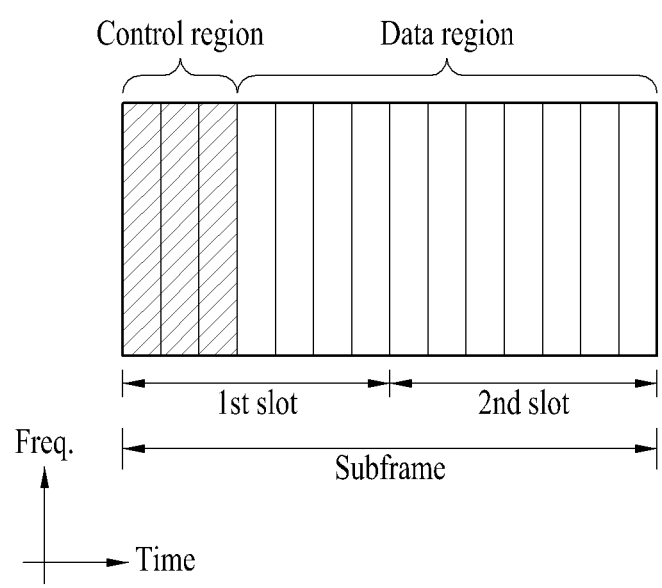
FIG. 4 is a diagram for a structure of a downlink subframe.

FIG. 4 is a diagram for a structure of a downlink subframe.

Referring to FIG. 4, Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols (i.e., a size of a control region) used for a transmission of control channels within the subframe. The PHICH is a response channel in response to UL transmission and carries ACK (acknowledgement)/NACK (not-acknowledgement) signals for a HARQ (hybrid automatic repeat request). Control information carried on PDCCH may be called downlink control information (hereinafter abbreviated DCI). The DCI may include UL resource allocation information, DL resource allocation information or a UL transmit power control command for a random UE (user equipment) group.

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs.

A base station determines a PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Figure 5:
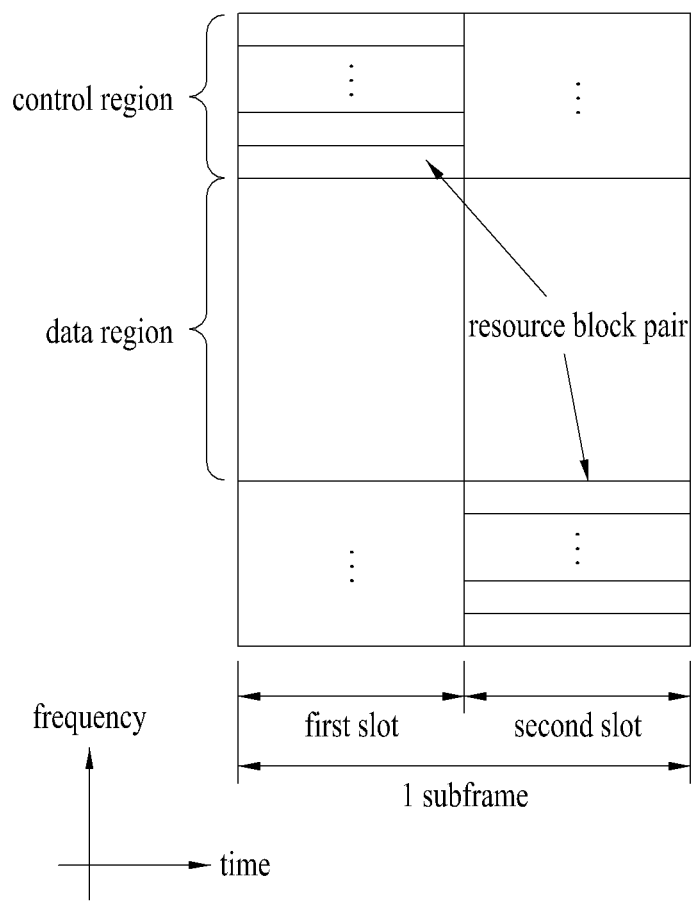
FIG. 5 is a diagram for a structure of an uplink subframe.

FIG. 5 is a diagram for a structure of an uplink (UL) subframe.

Referring to FIG. 5, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Downlink Reference Signal and Measurement of Downlink

When a packet (or signal) is transmitted in a wireless communication system, since the packet is transmitted via a radio channel, a signal may be distorted in the course of transmission. In order for a receiving end to correctly receive the distorted signal, it may be preferable that the distorted and received signal is corrected using channel information. In order to find out the channel information, a signal known to both of a transmitting end and the receiving end is transmitted and finds out the channel information with the extent of distortion when the signal is received on a channel. The signal known to both the transmitting end and the receiving end is called a pilot signal or a reference signal.

When a data is transmitted and received by a transmitting end or a receiving end using MIMO antenna to increase capacity and communication performance, it may be preferable that a channel state between a transmitting antenna and a receiving antenna is detected in order for a receiving end to correctly receive the data. Hence, in order for the receiving end to detect the channel state, each transmitting antenna of the transmitting end may preferably have an individual reference signal.

In a wireless communication system, a reference signal is mainly classified into two kinds according to the usage of the reference signal. The reference signal includes a reference signal used for obtaining channel information and a reference signal used for data demodulation. Since the former one is used for a user equipment to obtain the channel information in downlink, it is necessary to be transmitted by a wide band. Although a user equipment does not receive downlink data in a specific subframe, the user equipment should be able to receive and measure the reference signal. The reference signal used for measuring the channel can be used for handover measuring and the like. The latter one corresponds to a reference signal transmitted to a corresponding resource together with a downlink signal when a base station transmits the downlink signal. A user equipment can perform channel estimation by receiving the reference signal and may be then able to demodulate data. The reference signal used for data demodulation should be transmitted to a region to which data is transmitted.

As a downlink reference signal, 3GPP LTE system defines a CRS (common reference signal) shared by all user equipments in a cell and a DRS (dedicated reference signal) used for a specific user equipment. The CRS is used for two purposes including channel information acquisition and data demodulation. The CRS is also called a cell-specific RS. A base station transmits the CRS in every subframe over a wide band. On the contrary, the DRS is used for data demodulation only. If data demodulation on PDSCH is required, the DRS can be transmitted via resource elements. A user equipment can receive information on whether the DRS exists via an upper layer and the DRS is valid only when the DRS is mapped to corresponding PDSCH. The DRS can also be called a UE-specific RS or a DMRS (demodulation RS).

A receiving side (UE) can feedback such an indicator related to channel quality as CQI (channel quality indicator), PMI (precoding matrix index) and/or RI (rank indicator) to a transmitting side (base station) by estimating a channel state from the CRS. Or, a reference signal, which is related to a feedback of CSI (channel state information) such as CQI/PMI/RI, can be separately defined as a CSI-RS. Unlike a legacy CRS used for channel measurement and data demodulation at the same time, the CSI-RS used for measuring a channel is designed to mainly measure a channel. Hence, since the CSI-RS is transmitted to obtain information on a channel state, a base station transmits CSI-RS for all antenna ports. Unlike the DRS, since the CSI-RS is transmitted to obtain downlink channel information, the CSI-RS is transmitted on all bands.

Current 3GPP LTE system defines two kinds of transmission schemes including an open-loop MIMO which is managed without channel information of a receiving end and a closed-loop MIMO. In order to obtain multiplexing gain of MIMO antennas in the closed-loop MIMO, a transmitting end and the receiving end respectively perform beamforming based on channel information, i.e., channel state information (CSI). In order for a base station to obtain the CSI from a user equipment, the base station assigns PUCCH (physical uplink control channel) or PUSCH (physical uplink shared channel) to the user equipment and commands the user equipment to feedback downlink CSI.

The CSI is mainly classified into 3 kinds of information including RI (rank indicator), PMI (precoding matrix index) and CQI (channel quality indication).

The RI indicates rank information of a channel and means the number of signal stream (or layer) received via an identical frequency time resource by a user equipment. Since a value of the RI is dominantly determined by a long term fading of a channel, the value of the RI is fed back to a base station with an interval longer than a PMI and CQI value in general.

The PMI is a value to which a spatial characteristic of a channel is reflected. The PMI indicates a precoding index of a base station preferred by a user equipment on the basis of a metric including a SINR (signal to interference plus noise ratio. In particular, the PMI is information on a precoding matrix used for transmission of a transmitting end. The precoding matrix feedback by a receiving end is determined in consideration of the number of layers indicated by the RI. The PMI can be fed back in case of closed-loop multiplexing and large delay CDD transmission. In case of open-loop transmission, the transmitting end can select the precoding matrix according to a predetermined rule. A process for the receiving end to select the PMI for each rank is described in the following. The receiving end calculates previously processed SINR for each PMI, converts the calculated SINR into sum capacity and may be then able to select best PMI based on the sum capacity. In particular, calculating the PMI may correspond to a process of finding out the best PMI based on the sum capacity by the receiving end. Having fed back the PMI from the receiving end, the transmitting end can use the precoding matrix recommended by the receiving end as it is and may include the aforementioned event in data transmission scheduling allocation information, which is transmitted to the receiving end, as an indicator of 1-bit long. Or, the transmitting end may not use the precoding matrix indicated by the PMI, which is fed back from the receiving end, as it is. In this case, precoding matrix information, which is used by the transmitting end to transmit data to the receiving end, can be explicitly included in the scheduling allocation information.

The CQI is a value indicating strength of a channel and means a reception SINR capable of being obtained when a base station uses the PMI in general. A user equipment reports a CQI index, which indicates a specific combination in a set consisting of combinations of a predetermined modulation scheme and a code rate, to a base station.

In the following, a downlink reference signal is explained in detail.

Figure 6:
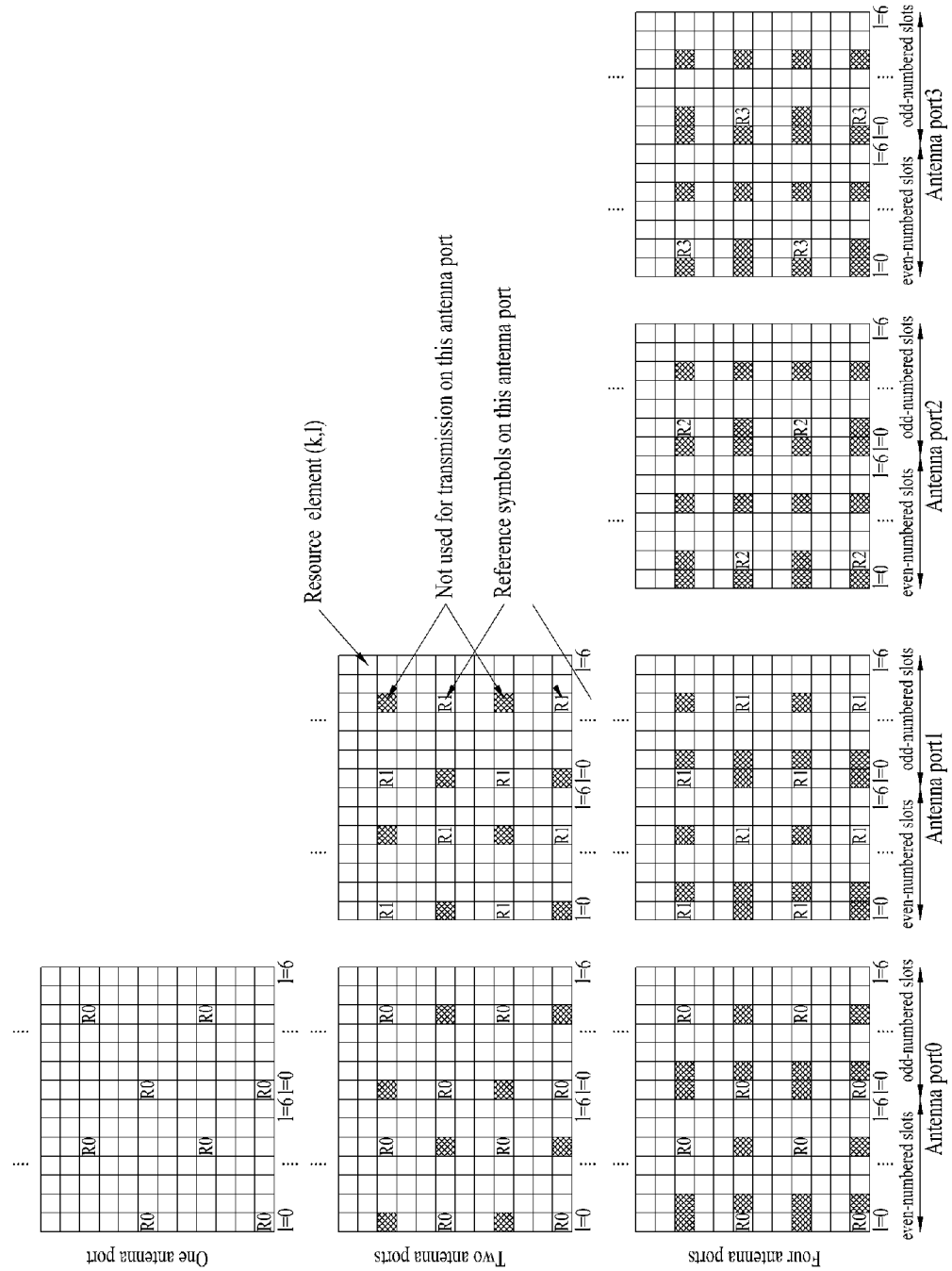
FIG. 6 is a diagram for an example of a pattern of a resource block on which a common reference signal (CRS) is arranged in case of using a normal cyclic prefix.

FIG. 6 is a diagram for an example of a pattern of a resource block on which a common reference signal (CRS) is arranged in case of using a normal cyclic prefix.

R0 to R3 shown in FIG. 6 indicate resource elements to which CRSs for an antenna port 0 to 3 are mapped, respectively. In particular, an Rp indicates a resource element to which a reference signal transmission is mapped on an antenna port index p.

A CRS of various forms is defined according to an antenna configuration of a transmitting side (base station). 3GPP LTE system supports various antenna configurations and a downlink signal transmitting side (base station) has 3 types of antenna configuration including a single antenna, 2 transmission antennas and 4 transmission antennas. When multiple antennas are supported, in case that a reference signal is transmitted in a prescribed antenna port, the reference signal is transmitted to a resource element (RE) position which is designated according to a reference signal pattern. On the contrary, no signal is transmitted to a resource element position which is designated for a different antenna port.

In order to improve channel estimation performance through a CRS, a position of a reference signal on frequency domain can be differentiated by shifting the position on the frequency domain in order to avoid collision of a reference signal between cells. As an example, in terms of a single antenna, each reference signal can be positioned with a space of 6 subcarriers on frequency domain. By doing so, at least 5 neighboring cells may put a reference signal on a position different from each other on frequency domain in a manner of shifting a position of a reference signal in a subcarrier unit on frequency domain.

And, signal interference of a pilot symbol, which is received from a neighboring cell by a receiver, can be reduced in a manner of multiplying a downlink reference signal per a cell by a predefined sequence (e.g., pseudo-random (PN), m-sequence, and the like), thereby improving channel estimation performance. A PN sequence is applied by a unit of OFDM symbol within a subframe. A PN sequence can be differently applied according to a cell ID, a subframe number, a position of OFDM symbol or a terminal ID.

Since a DM-RS corresponds to a reference signal used for demodulating data, the DM-RS is positioned at a region to which a downlink data channel is assigned. The DM-RS is allocated to a position where a CRS is not allocated among the region to which the downlink data channel is assigned. A user equipment is signaled on whether a DM-RS exists via an upper layer. In particular, the user equipment is signaled on whether a downlink data channel is transmitted based on a CRS or a DM-RS.

Figure 7:
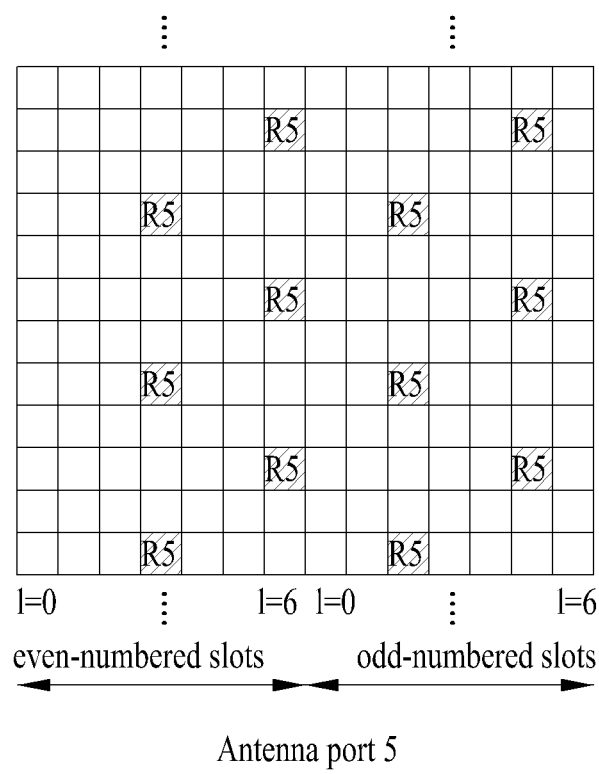
FIGS. 7 and 8 are diagrams for an example of a pattern of a resource block on which a UE-specific reference signal (DM-RS) is arranged in case of using a normal cyclic prefix.
Figure 8:
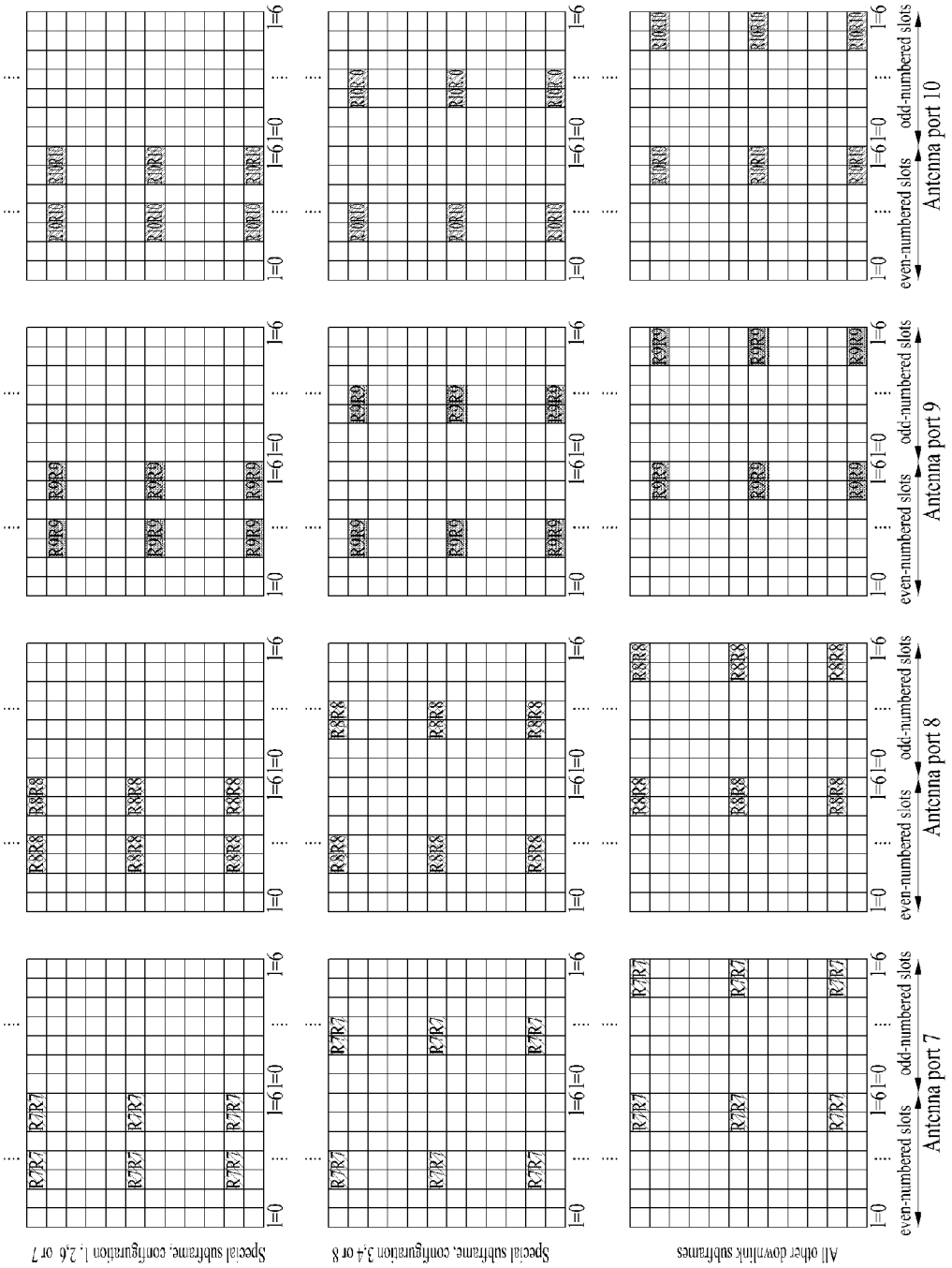

FIGS. 7 and 8 are diagrams for an example of a pattern of a resource block on which a UE-specific reference signal (DM-RS) is arranged in case of using a normal cyclic prefix.

3GPP LTE system defines DM-RSs for each of an antenna port p=5, an antenna port p=7, an antenna port p=8 and an antenna port p=7, 8, . . . , u+6, respectively. In this case, the v indicates the number of layers to which PDSCH is transmitted. DM-RSs for antenna ports different from each other can be distinguished from each other in a manner of being positioned at frequency resources (subcarriers) different from each other and/or time resources (OFDM symbols) different from each other. A DM-RS set (S) can be classified into S={7, 8, 11, 13} and S={9, 10, 12, 14}. A DM-RS can be transmitted to a user equipment via a prescribed antenna port included in a specific antenna port set (S). DM-RSs for antenna ports {7, 8, 11, 13} included in a DM-RS set 1 can be mapped to an identical resource element and the DM-RSs can be multiplexed by an orthogonal code. And, DM-RSs for antenna ports {9, 10, 12, 14} included in a DM-RS set 2 can be mapped to an identical resource element and the DM-RSs can be multiplexed by an orthogonal code. If the number of layers transmitted to a user equipment is less (e.g., if the number of transmission layers corresponds to 1 to 2), a DM-RS pattern for antenna ports included in a single set can be used. Yet, if the number of layers transmitted to a user equipment is big (e.g., if the number of transmission layers corresponds to 3 to 8), a DM-RS pattern for antenna ports included in two sets can be used.

FIG. 7 shows an example of a pattern of DM-RS transmitted on an antenna port 5. FIG. 8 shows an example of a pattern of DM-RS transmitted on an antenna port 7 to 10. R5 and R7 to R10 shown in FIG. 7 and FIG. 8, respectively, indicate resource elements to which DM-RSs for each of an antenna port 5 and an antenna port 7 to 10 are mapped. In particular, an Rp indicates a resource element to which a reference signal transmission is mapped on an antenna port index p.

Unlike a system including a legacy antenna configuration (e.g., LTE release-8 system supporting 4 transmission antennas), a system including an extended antenna configuration (e.g., LTE-A system supporting 8 transmission antennas) requires transmission of a new reference signal to obtain channel state information (CSI). Since the aforementioned CRS corresponds to a reference signal for an antenna port 0 to 3, it is required to additionally design a new reference signal capable of obtaining a channel state on an extended antenna port.

Irrespective of a CRS, a CSI-RS is proposed to measure PDSCH. Unlike the CRS, the CSI-RS can be defined by 32 configurations different from each other to reduce inter-cell interference (ICI) in multi-cell environment.

Configuration for a CSI-RS varies according to the number of antenna ports of a cell. A CSI-RS, which is defined by a configuration as different as possible, is configured to be transmitted between neighboring cells. And, a CSI-RS configuration is classified according to a type of a cyclic prefix (a normal prefix or an extended prefix). And, according to a type of a frame structure (FS), the CSI-RS configuration can be divided into a case of applying a CSI-RS to both a FS1 and a FS2 and a case of supporting the FS2 only. Unlike a CRS, a CSI-RS supports up to maximum 8 antenna ports (p=5, p=15, . . . , 18, or p=15, . . . , 22). The CSI-RS is defined for $\Delta f$=15 kHz only.

Figure 9:
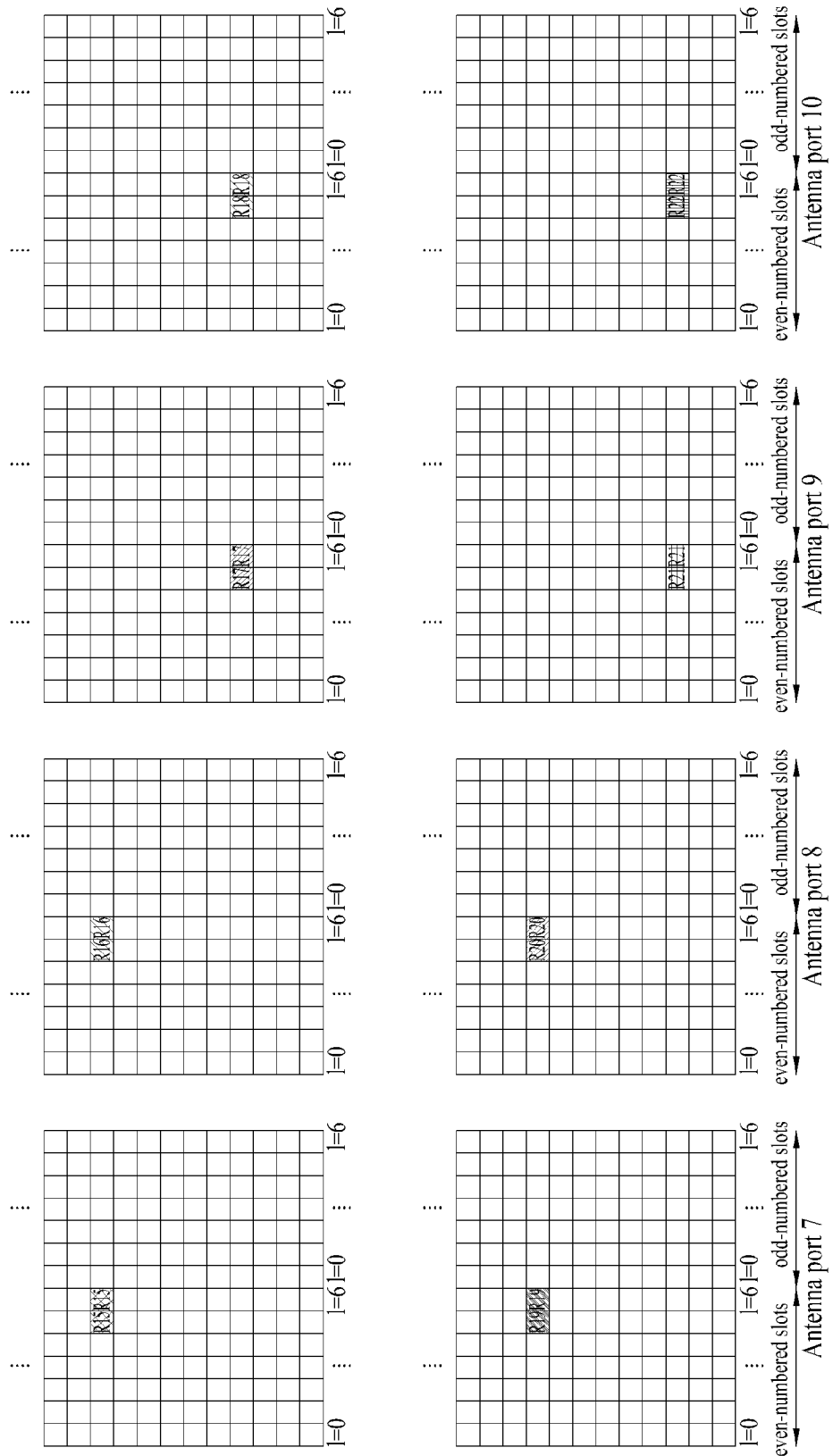
FIG. 9 is a diagram for an example of a pattern of a resource block on which a CSI-RS according to a CSI-RS configuration #0 is arranged in case of using a normal cyclic prefix.

FIG. 9 is a diagram for an example of a pattern of a resource block on which a CSI-RS according to a CSI-RS configuration #0 is arranged in case of using a normal cyclic prefix.

Referring to FIG. 9, it shows a position of a resource element to which a CSI-RS is transmitted on a resource block to which a downlink data is transmitted. CSI-RSs for antenna ports different from each other can be distinguished from each other in a manner of being positioned at frequency resources (subcarriers) different from each other and/or time resources (OFDM symbols) different from each other. CSI-RSs for antenna ports different from each other situating at an identical time-frequency resource can be distinguished from each other by an orthogonal code.

In an example of FIG. 8, each of CSI-RSs for an antenna port 15 and 16, CSI-RSs for an antenna port 17 and 18, CSI-RSs for an antenna port 19 and 20 and CSI-RSs for an antenna port 21 and 22 can be positioned at an identical resource element. The CSI-RSs can be multiplexed by an orthogonal code.

In the following, multi-CSI-RS configuration is explained.

A multi-CSI-RS configuration can be used in a single cell. In particular, it is able to use one (or 0) configuration that a user equipment assumes a non-zero transmission power for a CSI-RS and a plurality of configurations (or 0) that the user equipment assumes a zero transmission power.

For each bit set to 1 in a 16-bit bitmap 'ZeroPowerCSI-RS' configured by upper layer, the user equipment assumes the zero transmission power for resource elements corresponding to 4 CSI-RS columns of Table 1 and Table 2 in the following according to a normal cyclic prefix and an extended cyclic prefix, respectively. In this case, resource elements overlapped with non-zero transmission power CSI-RS resources configured by the upper layer are excluded. A top bit of the bitmap corresponds to a lowest CSI-RS configuration index and following bits correspond to CSI-RS configuration indexes in sequence.

In Table 1 and Table 2 according to a normal cyclic prefix and an extended cyclic prefix, respectively, a CSI-RS can exist in a downlink slot satisfying $n_s$ mod 2 only.

A user equipment assumes that a CSI-RS is not transmitted in the following cases.

A special subframe of a frame structure 2

A subframe in which a CSI-RS transmission is collided with a transmission of a synchronization signal, a physical broadcast channel or SystemInformationBlock-Type1

A subframe to which a paging message transmission is set

An antenna port set (S) can be classified into S={15}, S={15, 16}, S={17, 18}, S={19, 20} and S={21, 22}. A resource element (k,l), which is used for transmitting a CSI-RS on a specific antenna port in an antenna port set, is not used to transmit PDSCH via a different antenna port on an identical slot. Moreover, the resource element is not used to transmit a CSI-RS on a different antenna port in the antenna port set (S).

Table 1 shows an example of mapping relations of a resource element (k',l') according to a CSI-RS configuration in case of using a normal cyclic prefix.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 2 shows an example of mapping relations of a resource element (k',l') according to a CSI-RS configuration in case of using an extended cyclic prefix.

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |

TABLE 2-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 24 | (6, 1) | 1 | | | | |
| 25 | (2, 1) | 1 | | | | |
| 26 | (1, 1) | 1 | | | | |
| 27 | (0, 1) | 1 | | | | |

A CSI-RS can be transmitted in a specific subframe instead of every subframe. Specifically, a CSI-RS can be transmitted in a subframe satisfying Formula 1 in the following with reference to CSI-RS subframe configurations shown in Table 3 in the following.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

In Table 3, $T_{CSI-RS}$, $\Delta_{CSI-RS}$, $n_f$ and $n_s$ indicate a period of transmitting a CSI-RS, an offset value, a system frame number and a slot number, respectively. $I_{CSI-RS}$ can be individually configured according to a CSI-RS.

$$(10n_f + \lfloor n_s/2 \rfloor - \Delta_{CSI-RS}) \bmod T_{CSI-RS} = 0 \quad \text{[Formula 1]}$$

And, the aforementioned CSI-RS can be signaled to a user equipment as a CSI-RS config information element shown in Table 4 in the following.

TABLE 4

```
-- ASN1START
CSI-RS-Config-r10 ::=      SEQUENCE {
    csi-RS-r10             CHOICE {
        release            NULL,
        setup              SEQUENCE {
            antennaPortsCount-r10   ENUMERATED (an1, an2, an4, an8),
            resourceConfig-r10      INTEGER (0..31),
            subframeConfig-r10      INTEGER (0..154),
            p-C-r10                 INTEGER (-8..15)
        }
    }                                      OPTIONAL,   -- Need ON
    zeroTxPowerCSI-RS-r10     CHOICE {
        release               NULL,
        setup                 SEQUENCE {
            zeroTxPowerResourceConfigList-r10  BIT STRING (SIZE (16)),
            zeroTxPowerSubframeConfig-r10      INTEGER (0..154)
        }
    }                                      OPTIONAL    -- Need ON
}
-- ASN1STOP
```

In Table 4, 'antennaPortsCount-r10' indicates the number of antennas transmitting a CSI-RS (select one of 1, 2, 4, and 8). 'resourceConfig-r10' indicates a position of a RE at which a CSI-RS is positioned in one RB in time-frequency resource. 'subframeConfig-r10' indicates a subframe in which a CSI-RS is transmitted together with a CSI-RS EPRE value for PDSCH EPRE. In addition, a base station also delivers information on a zero power CSI-RS.

In a CSI-RS configuration, 'resourceConfig-r10' indicates a position to which a CSI-RS is transmitted. The 'resourceConfig-r10' indicates a precise symbol position and a subcarrier position in one resource block according to a CSI-RS configuration number (refer to Table 1 or Table 2) represented by numbers ranging from 0 to 31.

Table 5 shows an example of description of a CSI-RS configuration field.

| CSI-RS configuration field descriptions |
|---|
| antennaPortsCount |
| A parameter indicating the number of antenna ports used to transmit a CSI-RS. |
| An antenna 1 corresponds to 1, an antenna 2 corresponds to 2 and so on. |
| p-C |
| $P_c$ parameter |
| resourceConfig |
| A parameter indicating a CSI-RS configuration |
| subframeConfig |
| $I_{CSI-RS}$ parameter |
| zeroTxPowerResourceConfigList |
| ZeroPowerCSI-RS parameter |
| zeroTxPowerSubframeConfig |
| $I_{CSI-RS}$ parameter |

A Method of Performing Downlink Beamforming Using Multi Codebook

A massive MIMO (massive multi-input multi-output) system maximizes a beam gain and can eliminate intra-cell interference and noise impact using a plurality of antennas. In order to apply the massive MIMO system to downlink or uplink of a cellular network, a transmission scheme may vary according to a duplex scheme such as TDD (time division duplex) and FDD (frequency division duplex).

A TDD system indicates a system that downlink and uplink use an identical frequency band and the band is distinguished by time. Hence, in case that coherence time of a radio channel is big, in other word, in case that a Doppler effect is small, it may assume that a radio channel characteristic of downlink and a radio channel characteristic of uplink are identical to each other. This may be called reciprocity. Hence, a base station performs channel estimation using reference signals (RS) of user equipments transmitted in uplink and can transmit a downlink signal using channel information estimated in downlink transmission. In particular, since the base station does not need to transmit a separate downlink reference signal to obtain downlink channel information, a gain can be obtained in terms of resource overhead and it works as a big gain in the massive MIMO using a plurality of antennas. And, in terms of beamforming, which is a main purpose of the massive MIMO system, as mentioned in the foregoing description, a transmitting end (e.g., base station) can calculate a beamforming vector using a channel or a signal transmitted by a receiving end (e.g., user equipment) in TDD system using reciprocity. The beamforming vector indicates a vector configured by weighted values applied to each of antennas. For instance, if the beamforming vector corresponds to $w=[w_1 w_2 \ldots w_N]^T$, a transmission signal S is transmitted on a $k^{th}$ antenna in a manner of being multiplied by $w_k$. Yet, in case of TDD system, it should consider a gap for time taken for switching between downlink and uplink, i.e., transition guard time, on a frame structure in consideration of round trip delay. In particular, as a cell coverage becomes bigger, the transition guard time increases, thereby lowering throughput. Hence, TDD system may have a limit on a cell coverage compared to FDD system. And, the TDD system should consider an identical DL/UL configuration between base stations to control interference impact between neighboring base stations and there exists a constraint condition that uplink/downlink transmission synchronization should be achieved between base stations. Due to the aforementioned demerit of the TDD system, a duplex scheme of the massive MIMO can be considered for the FDD as well.

FDD system is a system that downlink and uplink use frequency different from each other. Hence, unlike TDD, a base station cannot use channel information, which is estimated using reference signals (RS) of user equipments transmitted in uplink, in case of transmitting in downlink. In particular, since the FDD system is unable to use a characteristic of channel reciprocity, it should find out another method. Hence, unlike TDD system, in case of the FDD system, in order for a base station to obtain channel information on downlink, the base station should transmit a reference signal to a user equipment and should receive channel information from the user equipment in response to the reference signal. In particular, the base station provides a reference signal or a pilot signal capable of estimating a channel of each antenna of a transmitting end (e.g., base station) to the user equipment and a receiving end (e.g., user equipment) reports channel state information to the base station based on the channel estimated using the reference signal.

According to IEEE 802.16m or LTE/LTE-A system, a user equipment (i.e., receiving end) selects an appropriate beamforming vector (or precoding matrix/vector) from a code book corresponding to the number of antennas of a base station (i.e., transmitting end) and reports an index of the beamforming vector to the base station. According to the code book-based beamforming (or precoding), an amount of information transmitted to a base station by a user equipment is dependent upon a size of the code book. In general, when a code book of a size less than 6 bits is used, suboptimal performance can be obtained compared to optimal performance in 2.4 or 8 Tx system. Hence, a scheme of using the code book size less than 6 bits is a preferable scheme capable of being used in a commercial system. And, as a method of obtaining a beamforming gain in the FDD system, besides the code book-based beamforming, such a scheme as a scheme of informing a base station of a quantized channel matrix or a covariance matrix or a scheme of transmitting a not quantized analog value to a base station as it is has been proposed.

Yet, since the massive MIMO considers a large number of antennas, it should consider not only overhead of a reference signal but also feedback overhead transmitted by a user equipment. In the FDD system, if the number of antennas of a base station corresponds to 100 and all antennas are used for beamforming, the number of resource elements (REs) used by the base station to transmit a reference signal may exceed 100. In this case, the resource element may indicate a resource capable of being used not only in time/frequency but also in a code region. For instance, in order to transmit a CRS in one resource block (RB) in LTE system, 8 resource elements (in case of using single antenna), 16 resource elements (in case of using 2 antennas) or 24 resource elements (in case of using 4 antennas) are used. On the contrary, in order to transmit a CSI-RS, 8 resource elements are used (in case of using 8 antennas). Hence, in order to apply the massive MIMO, a reference configuration (the number of antennas: the number of reference signals=1:1) such as a CSI-RS is used. If a minimum unit of scheduling corresponds to one resource block (12 subcarriers*7 OFDM symbols=84 resource elements), there is no way to transmit 100 reference signals in one resource block. Moreover, if 6 resource blocks are regulated as a minimum unit of scheduling, since 100 resource elements are used for reference signals out of 6 resource blocks (504 resource elements), it works as serious overhead (about 20%).

Overhead occurring according to the increase of the number of antennas may also operate as overhead when an amount of feedback information of a user equipment and code book are designed as well as reference signal overhead. For instance, a code book should be designed based on lots of mathematical/experimental data according to the number of antennas transmitted by a base station. This may cause a result that the base station has huge amount of constraint conditions and types of code book for the number of transmitting antennas. And, in order to use a code book-based-closed loop MIMO, as the number of antennas increases, the number of dimensions represented by code books as many as the number of antennas should also increase and precoding matrixes should be designed to robustly work for all channels as possible as they can. Hence, a size of a code book proportionally increases as well. Moreover, a user equipment should perform lots of calculations to calculate appropriate PMI in a code book. Due to the increase of a type of a code book and a size of a code book, an amount of information feedback by the user equipment or the number of bits also increases. As mentioned in the foregoing description, a channel information feedback process for a legacy downlink is not appropriate for the massive MIMO which considers a large number of antennas. Hence, a closed MIMO scheme of a new way is required.

The present invention proposes a scheme to solve a problem capable of being occurred when the massive MIMO system is applied. Although the present invention is explained under an assumption that the present invention is applied to a FDD system for clarity, it is apparent that the proposed scheme can also be applied to a TDD system in which a reciprocity characteristic is not valid or a case that a user equipment performs feedback on a downlink channel. Consequently, the present invention can be applied to both the FDD system and the TDD system.

A distance between a large number of antennas of the massive MIMO is short due to space restraints, thereby increasing a correlation value between antennas or a spatial correlation value. Channels received from antennas different from each other may be related to each other. This may be called antenna correlation. For instance, when correlation between two antennas is big, if a channel size value of a signal received from one antenna becomes big/small, a channel size value of a signal received from another antenna also becomes big/small. If a correlation value between antennas corresponds to 1, a channel size value identically changes in both antennas. Antenna correlation/spatial correlation correspond to a value dependent of AOA (angle of arrival) of a transmission signal, AS (angle/azimuth spread) and a distance between antennas. As the AOA is greater, as the AS is smaller or as the distance between antennas is closer, the antenna correlation/spatial correlation have a higher value. Regarding this, it is explained with reference to FIG. 10 in the following.

Figure 10:
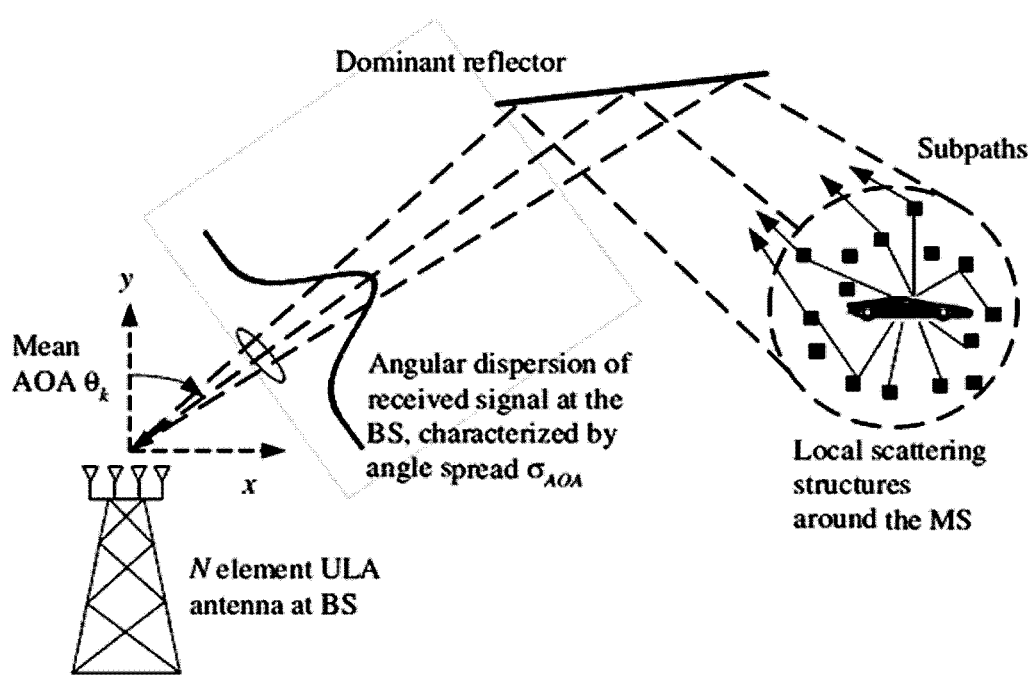
FIG. 10 is a diagram for explaining a concept of a parameter (AOA, AS) related to a spatial correlation in uplink.

FIG. 10 is a diagram for explaining a concept of a parameter (AOA, AS) related to a spatial correlation in uplink.

Since a signal transmitted from a transmitter and a signal, which has experienced various time delays and various attenuations, are arrived at a receiver in a manner of being overlapped with each other, lots of signals arrive at the receiver via a single path. In this case, the lots of signals may be called a sub-ray. In general, a signal may indicate an average of power values of lots of sub-rays. This may be called a ray. An AOA indicates an average of AOAs of lots of sub-rays arriving at the receiver. An AS indicates the extent of dispersion of a sub-ray. The AS can be represented by a distribution form of PSD (power spectral density) of a sub-ray.

FIG. 10 shows a case that a signal transmitted by a user equipment is reflected by local scattering structures and the signal is received by a base station via a dominant reflector. As mentioned in the foregoing description, the signal transmitted by the user equipment and a signal, which has experienced various time delays and various attenuations by the aforementioned structures and the reflector, are overlapped with each other and the base station receives the signals. In this case, an AOA average value of signals (sub-path/sub-ray) received by a $k^{th}$ antenna of the base station corresponds to AOA ($\theta_k$) and a dispersion value for each of the signals (sub-path/sub-ray) corresponds to AS ($\sigma_{AOA}$). In terms of downlink, this sort of concept may apply to a signal received by the user equipment instead of the signal received by the base station.

A correlation value between a $P^{th}$ antenna and an $n^{th}$ antenna can be represented as Formula 2 in the following.

$$\rho_s = |R_s(n,p)|^2 = |\Re\{R_s(n,p)\} + j\Im\{R_s(n,p)\}|^2$$

In this case, values included in Formula 2 can be represented as follows according to distribution (i.e., PSD dispersion) of an AOA.

First of all, if an AOA has a uniform distribution, it may be represented as Formula 3 in the following.

$$\Re\{R_s(n, p)\} = J_0(Z_{np}) + 2\sum_{v=1}^{\infty} J_{2v}(Z_{np})\cos(2v\theta)\mathrm{sinc}(2v\Delta) \quad \text{[Formula 3]}$$

$$\Im\{R_s(n, p)\} = 2\sum_{v=1}^{\infty} J_{2v+1}(Z_{np})\sin[(2v+1)\theta]\mathrm{sinc}[(2v+1)\Delta]$$

In Formula 3, $Z_{np}=2\pi|p-n|d/\lambda$, d indicates a distance between antennas, $\lambda$ indicates a wavelength, $\theta$ indicates an average value of AOA and $\Delta=\sqrt{3}\cdot\sigma_{AOA}$ indicates a scattering angle. $J_n(x)$ indicates an $n^{th}$ Bessel function $$\mathrm{sinc}(x) = \frac{\sin(x)}{x}.$$

Subsequently, if an AOA has a Gaussian distribution, it may be represented as Formula 4 in the following.

$$\Re\{R_s(n, p)\} = \quad \text{[Formula 4]}$$

$$J_0(Z_{np}) + 2C_g \sum_{v=1}^{\infty} J_{2v}(Z_{np})\cos(2v\theta)\exp(-2v^2\sigma_{AOA}^2)$$

$$\Re\left\{\mathrm{erf}\left(\frac{\pi + j2v\sigma_{AOA}^2}{\sqrt{2}\,\sigma_{AOA}}\right)\right\}$$

$$\Im\{R_s(n, p)\} = 2C_g \sum_{v=0}^{\infty} J_{2v+1}(Z_{np})\sin[(2v+1)\theta]$$

$$\exp\left[\frac{-(2v+1)^2\sigma_{AOA}^2}{2}\right]\Re\left\{\mathrm{erf}\left(\frac{\pi + j(2v+1)\sigma_{AOA}^2}{\sqrt{2}\,\sigma_{AOA}}\right)\right\}$$

In Formula 4, it may be represented as $$C_g = \frac{1}{\mathrm{erf}(\pi/\sqrt{2}\,\sigma_{AOA})}$$

and $\mathrm{erf}(x)=2/(\sqrt{\pi})\int_0^x e^{-t^2}dt$.

Although Formula 3 and Formula 4 show examples of a correlation function for the uniform distribution and the Gaussian distribution, respectively, by which the present invention may be non-limited. An AOA may have a different distribution as well.

Figure 11:
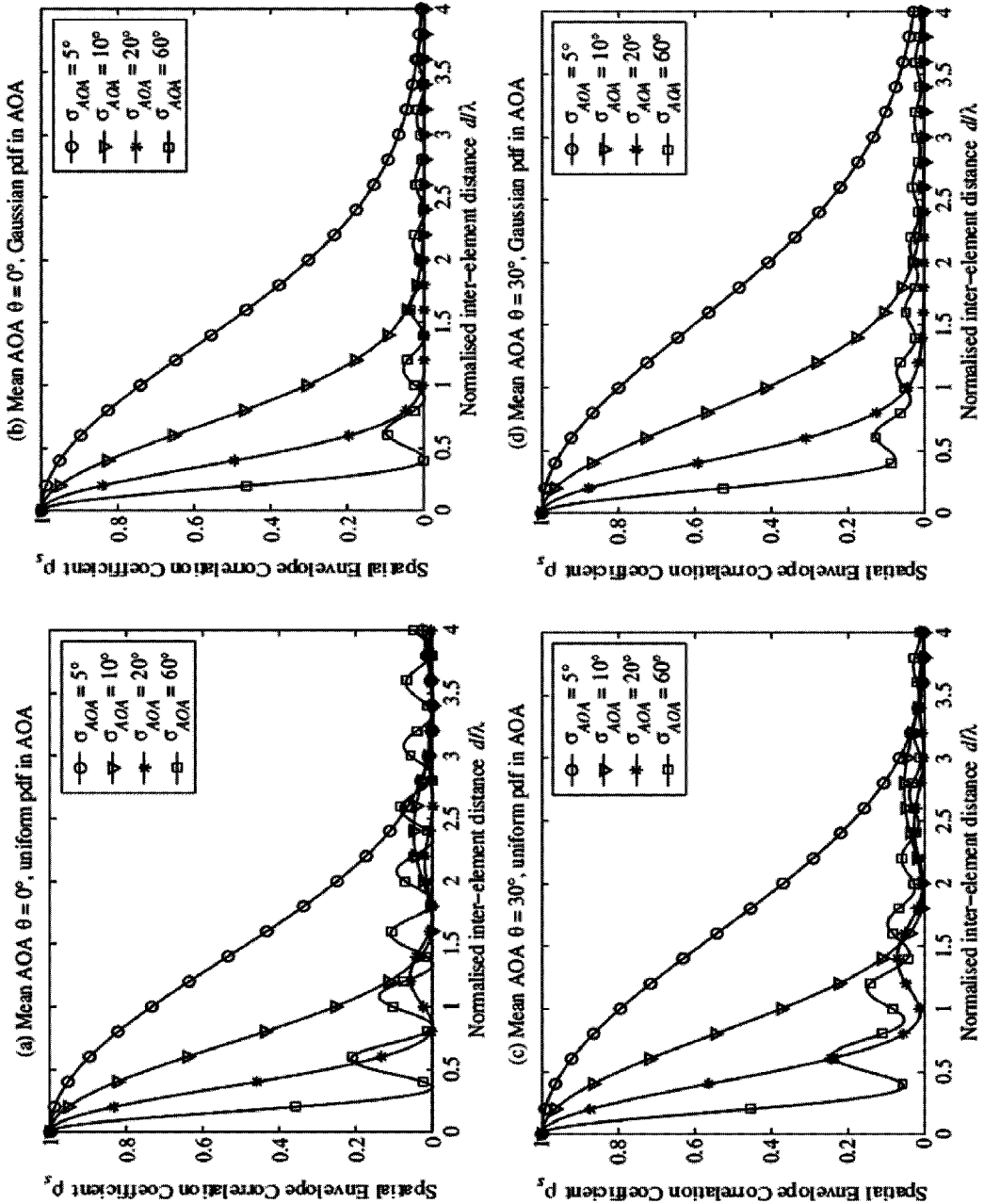
FIGS. 11 and 12 are diagrams for an example of a spatial correlation value according to a distribution form of AOA.
Figure 12:
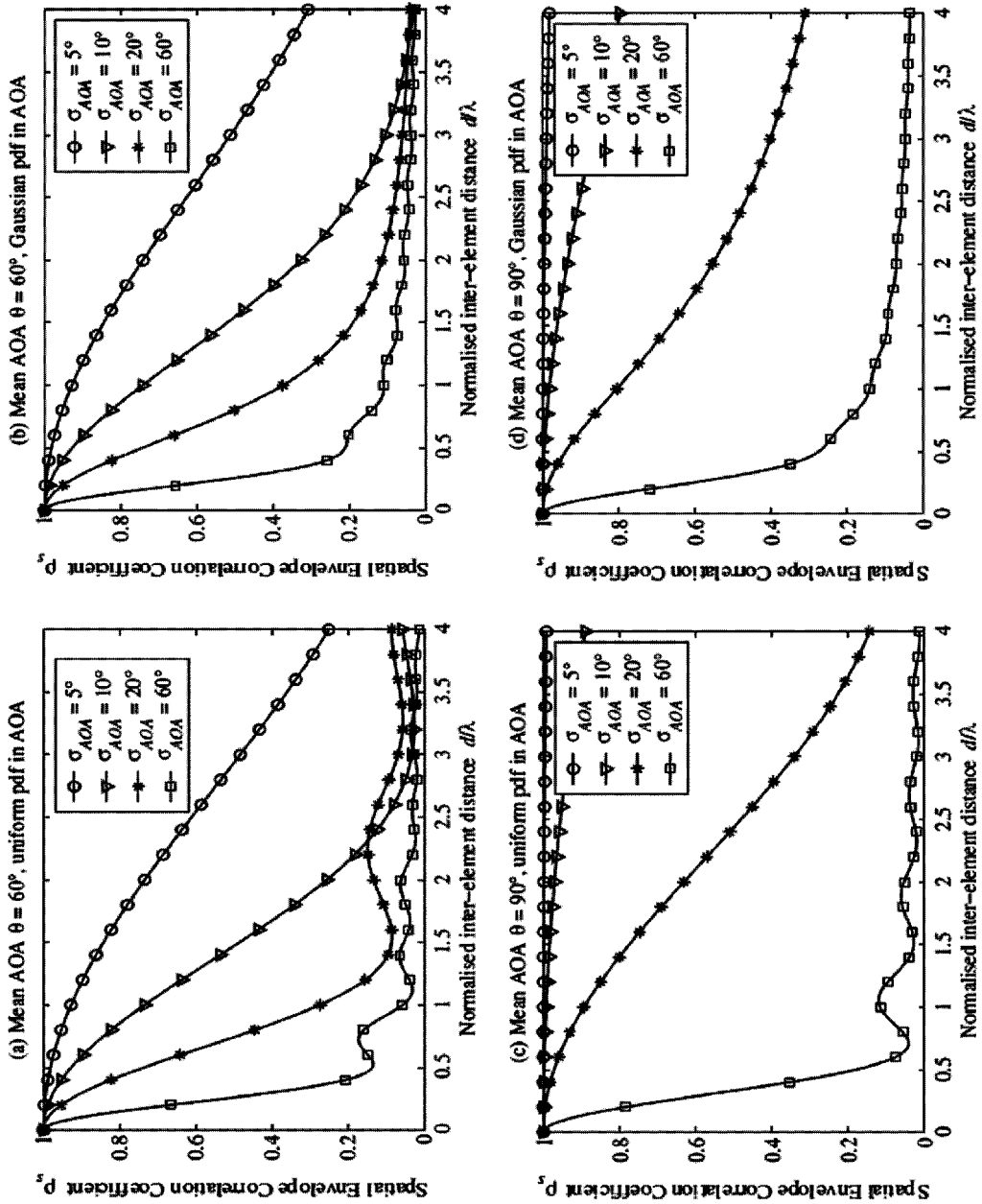

FIGS. 11 and 12 are diagrams for an example of a spatial correlation value according to a distribution form of AOA.

Referring to FIG. 11 and FIG. 12, a spatial correlation value is represented according to AOA average (o degree, 30 degrees, 60 degrees and 90 degrees) in accordance with a distribution form (uniform distribution or Gaussian distribution) of AS. In FIGS. 11 and 12, a vertical axis indicates a spatial correlation value and a horizontal axis indicates a distance between antennas. As shown in FIGS. 11 and 12, as an AOA average value is greater, as an AS value is smaller, as a distance between antennas is closer, it may have a higher correlation value between antennas.

Meanwhile, in case that a spatial correlation value is high, a channel response size value (magnitude/amplitude) shows a similar characteristic.

Figure 13:
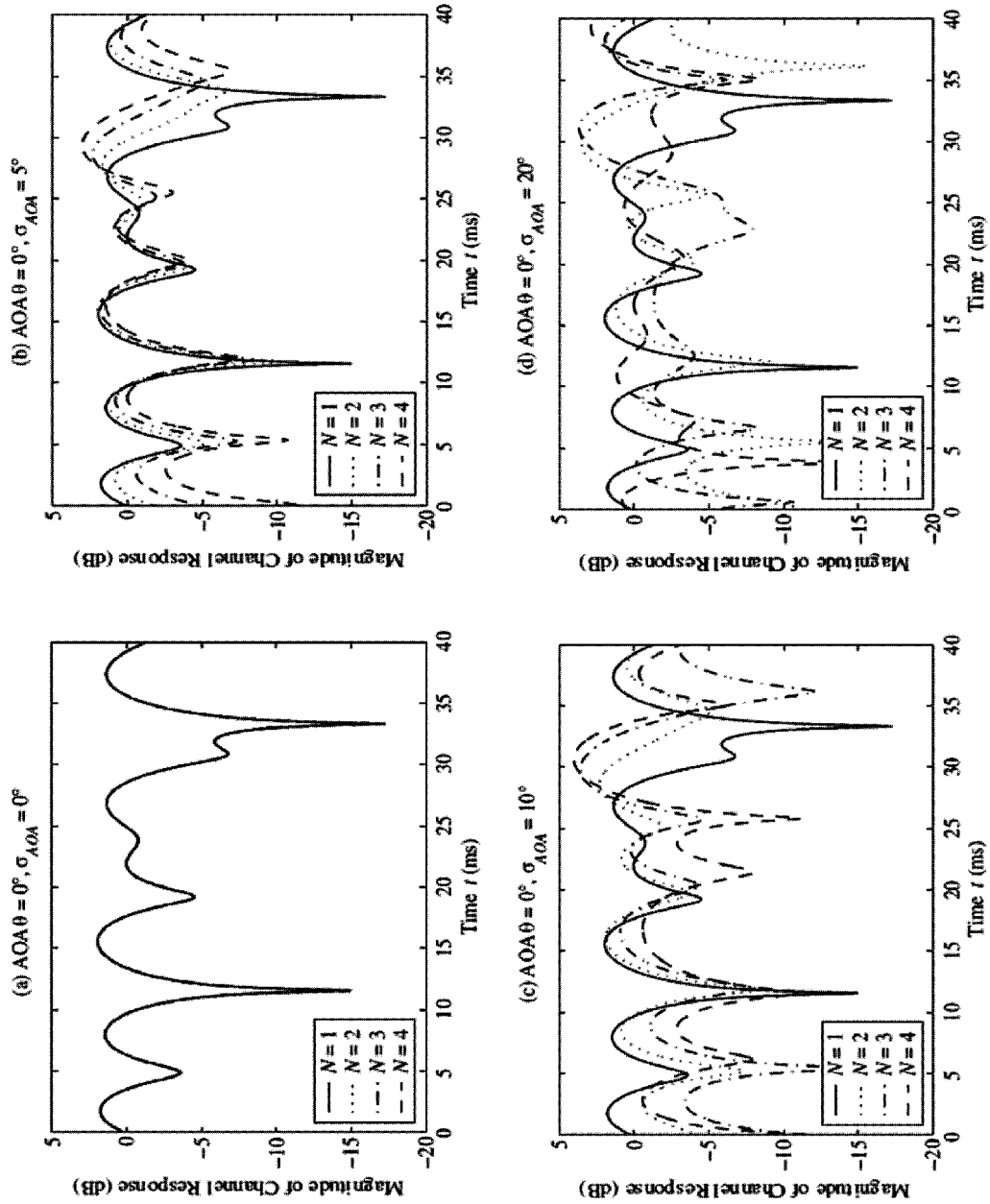
FIG. 13 is a diagram for an example of a channel response size value for each antenna.

FIG. 13 is a diagram for an example of a channel response size value for each antenna.

Referring to FIG. 13, it shows a channel response size value for each antenna according to a $\sigma_{AOA}$ value in case that the total number of antennas corresponds to 4. As the $\sigma_{AOA}$ value is getting smaller, a spatial correlation value is getting bigger. Hence, a channel response for each antenna has a characteristic similar to each other. If the $\sigma_{AOA}$ value corresponds to 0, channel response size values of all antennas become identical to each other. And, an angle value of a channel response shows an identical difference angle between antennas.

Figure 14:
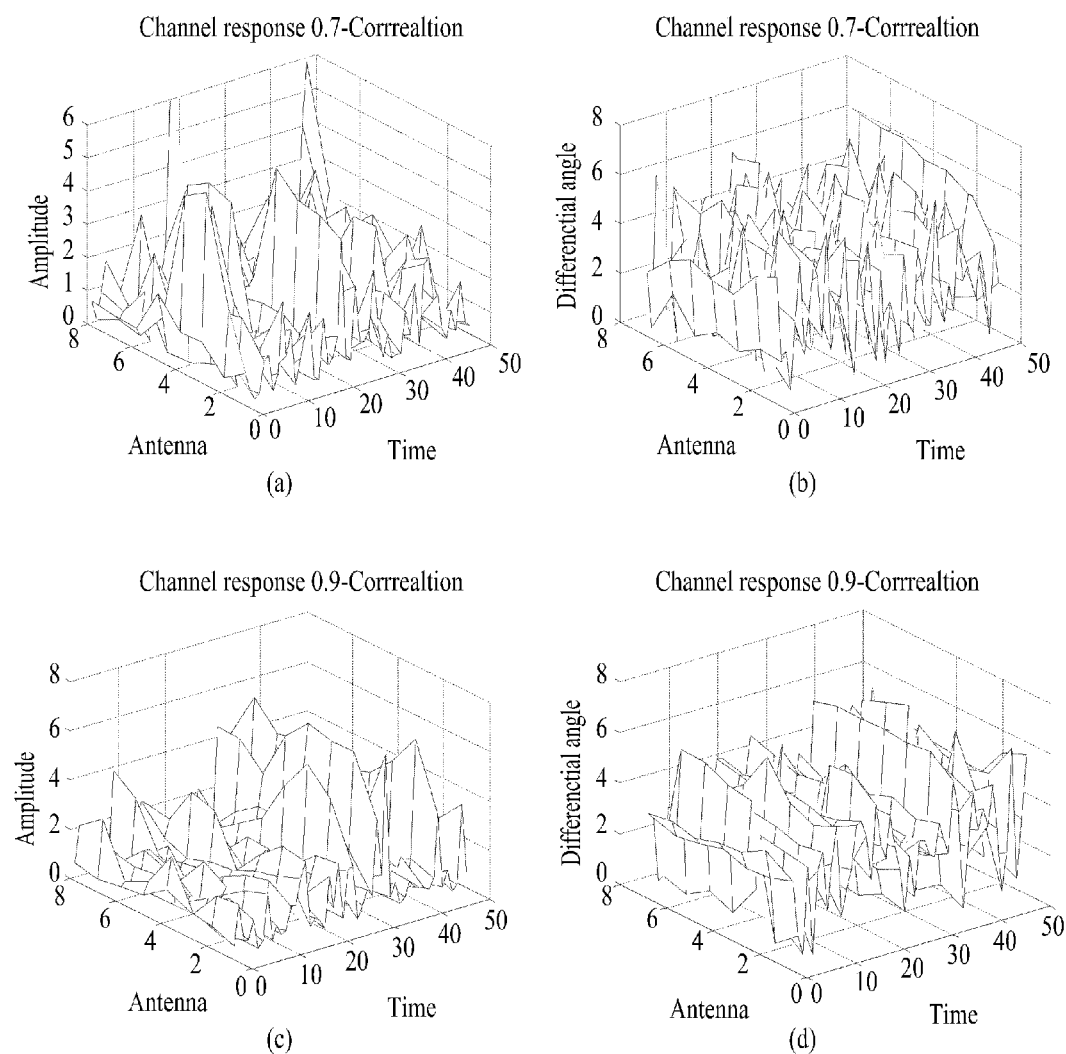
FIGS. 14 and 15 are diagrams for an example of a channel response size for each antenna and a difference angle between antennas.
Figure 15:
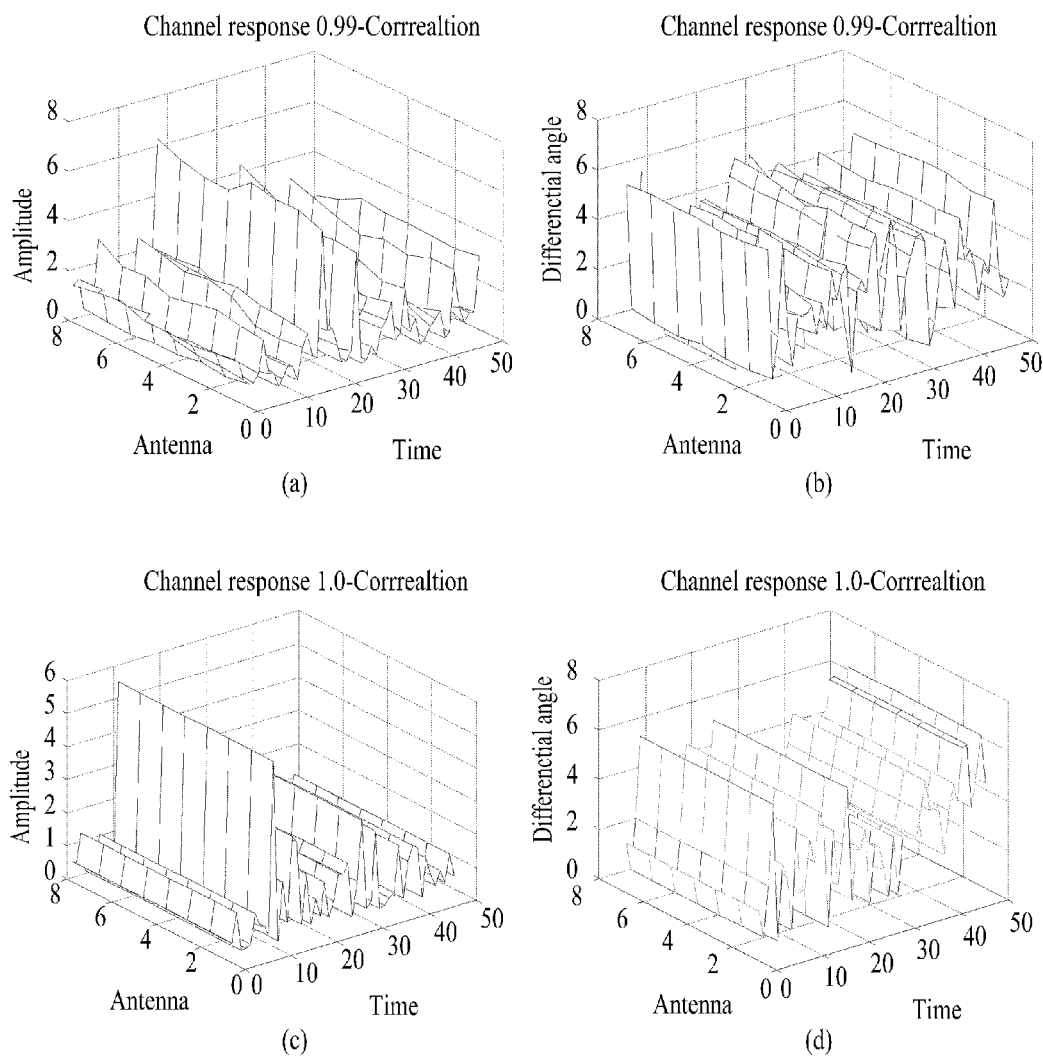

FIGS. 14 and 15 are diagrams for an example of a channel response size for each antenna and a difference angle between antennas.

Referring to FIGS. 14 and 15, it shows a channel response size difference (difference magnitude) for each antenna and a difference angle between antennas according to a correlation value (0.7, 0.9, 0.99 and 1.0) in case that the total number of antennas corresponds to 8. As a correlation value is getting bigger, both a channel response for each antenna and an angle between antennas has similar characteristics. If the correlation value corresponds to 1, a channel response size value and an angle value between antennas become identical to each other for all antennas.

As mentioned in the foregoing description, the scheme proposed by the present invention is based on a characteristic that a channel response size value for each antenna or a difference angle between antennas is similar to each other in case that a size of a spatial correlation value is big. In case of using the proposed scheme, a channel response for downlink can be calculated without transmitting a reference signal, which is used to be transmitted by all antennas to transmit downlink. In particular, a base station transmits reference signals in a prescribed number of antennas only and a user equipment calculates channel responses for the antennas (hereinafter called 'first set'), which have transmitted the reference signals. Hence, the user equipment can estimate channel responses for antennas (hereinafter called 'second set'), which have not transmitted reference signals, from the antennas which have transmitted the reference signals. In order to estimate channels for antennas consisting of 2 sets, following schemes can be considered.

In the following, for clarity, assume a case that a base station has a total N number of antennas to transmit downlink, the M numbers of antennas have transmitted a reference signal, the J numbers of antennas have not transmitted a reference signal and there exist L number of layers.

Figure 16:
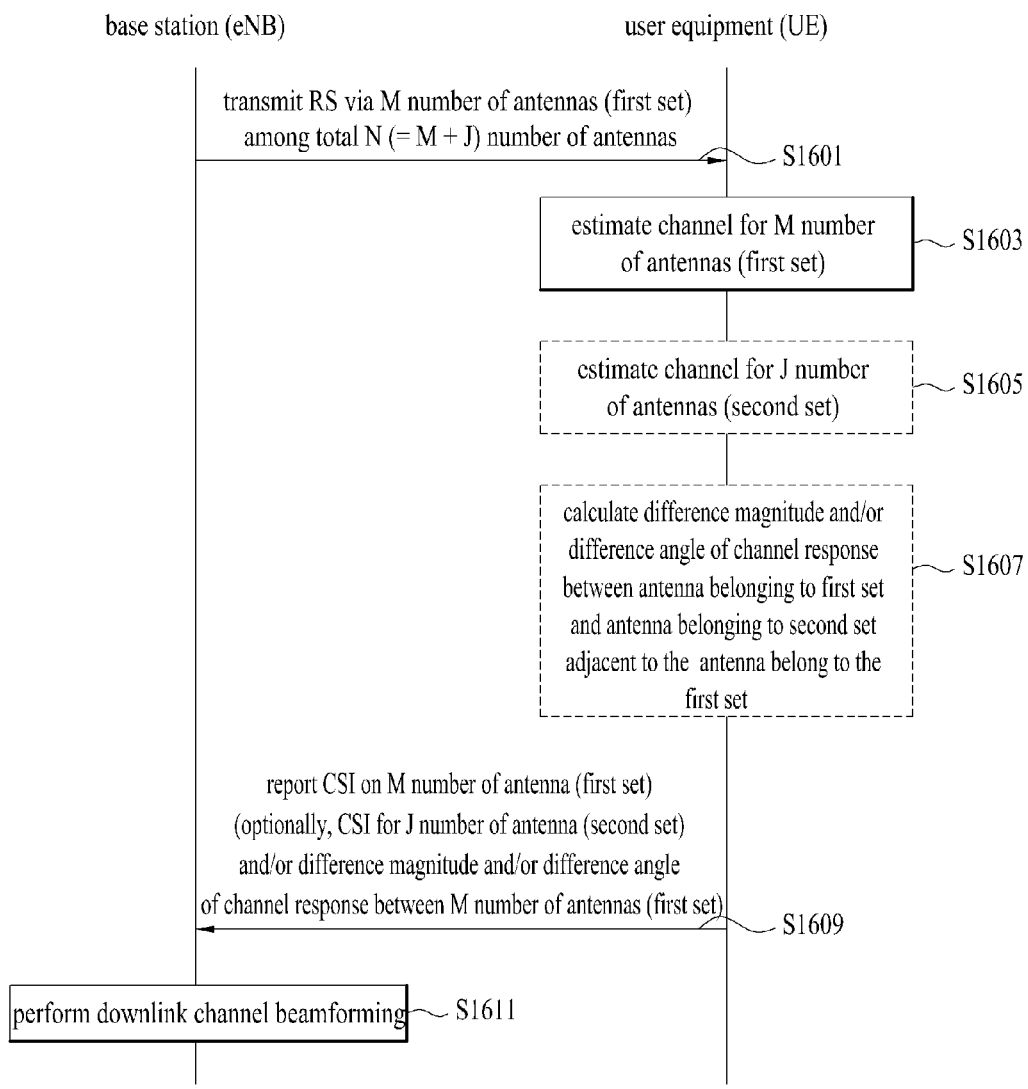
FIG. 16 is a flowchart for a method of performing beamforming method using multiple codebooks according to one embodiment of the present invention.

FIG. 16 is a flowchart for a method of performing beamforming method using multiple codebooks according to one embodiment of the present invention.

Figure 17:
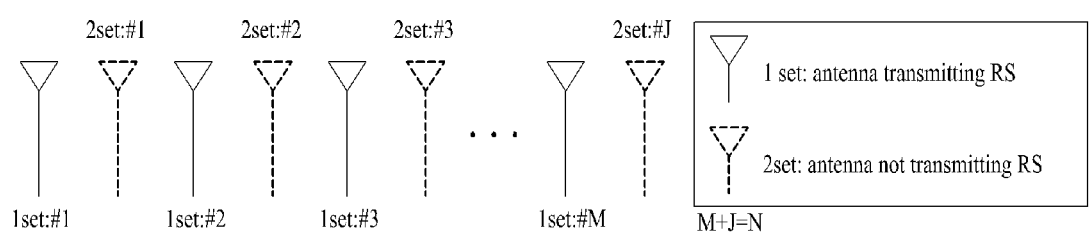
FIG. 17 is a diagram for an example of a configuration of an antenna transmitting a reference signal and a configuration of an antenna not transmitting a reference signal according to one embodiment of the present invention.

FIG. 17 is a diagram for an example of a configuration of an antenna transmitting a reference signal and a configuration of an antenna not transmitting a reference signal according to one embodiment of the present invention.

Referring to FIGS. 16 and 17, a base station transmits reference signals to a user equipment using M number of antennas (first set) only among a total N number of antennas [S1601]. As shown in an example of FIG. 17, among the total N number of antennas, there may exist M number of antennas (the first set) (first set #1, #2, #3, . . . , #M) transmitting a reference signal and J number of antennas (the second set) (second set #1, #2, #3, . . . , #J) not transmitting a reference signal. In the example of FIG. 17, M is identical to J and the sum of the M and the J is equal to the total number of antennas N. The antennas transmitting the reference signal can be designed by a structure including a prescribed pattern. For instance, the antennas (the first set) transmitting M number of reference signals may be arrayed with a prescribed space (or gap) in ULA (uniform linear array) (refer to FIG. 17), arrayed in a comb type (e.g., arrayed with a prescribed space in a diagonal direction in two dimension planar array antenna) or arrayed in a structure such as a grid or stepping stones (e.g., arrayed with a prescribed space in a horizontal or vertical direction in two dimension planar array antenna).

The user equipment estimates channels for the M number of antennas (first set) using the reference signals transmitted by the M number of antennas (first set) [S1603].

The user equipment selectively estimates channels for the J number of antennas (second set) based on information on the channels estimated for the M number of antennas (first set) and may be then able to calculate CSI for the J number of antennas (second set) [S1605].

In this case, it is able to estimate the channels for the J number of antennas (second set) using schemes described in the following.

First of all, an interpolation scheme can be used. In particular, channel values for the J number of antennas (second set) are calculated by performing the interpolation scheme for the channels estimated via the M number of antennas (first set). In this case, the interpolation scheme can be performed using such an interpolation scheme as linear interpolation, interpolation of second-degree polynomial or higher degree interpolation such as a cubic spline. And, in case of performing the interpolation scheme performed by a user equipment, the interpolation can be respectively performed for a real number and an imaginary number in response to the channel responses of the M number of antennas (first set). Or, the channel responses of the M number of antennas (first set) are divided in accordance with a magnitude and an angle and the interpolation can be respectively performed for the magnitude and the angle.

For instance, in the example shown in FIG. 17, a channel response for a second set antenna #1, which is not transmitted a reference signal, can be estimated using the interpolation based on a channel response value of a first set antenna #1 and a channel response value of a first set antenna #2. Similarly, channel responses for the remaining second set antennas (second set #2, . . . , #J) can be estimated in a same manner.

Secondly, a MMSE (minimum mean square estimation) scheme can be used. In particular, if a correlation function between antennas is known, channel estimation for the J number of antennas (second set), which have not transmitted reference signals, can be performed. In order to perform the MMSE scheme, Formula 5 in the following is used.

$$\hat{H} = R_{H\tilde{H}} R_{\tilde{H}\tilde{H}}^{-1} H = R_{H\tilde{H}} \left( R_{HH} + \frac{1}{SNR} I \right)^{-1} \tilde{H} \qquad \text{[Formula 5]}$$

In Formula 5, $\tilde{H}$ indicates a channel estimated by the first set and $R_{H\tilde{H}}$ indicates a cross-covariance matrix between a channel H and the estimated channel $\hat{H}$. Elements of the covariance matrix $R_{H\tilde{H}}$ and elements of $R_{HH}$ indicate a correlation value between antennas different from each other. $R_{HH}$ indicates a correlation value between antennas in which a reference signal is transmitted. $R_{H\tilde{H}}$ indicates a correlation value between an antenna in which a reference signal is transmitted and an antenna in which a reference signal is not transmitted.

In this case, a correlation value (e.g., $R_{HH}$ or $R_{H\tilde{H}}$) between a $P^{th}$ antenna and an $n^{th}$ antenna can be obtained by Formula 6 in the following.

$$E[h_p \tilde{h}_n^*] = E[h_p h_n^*] = R_s(n,p) \qquad \text{[Formula 6]}$$

In Formula 6, $R_s(n, p)$ is a correlation function for each antenna and can be given as shown in Formula 3 (in case of uniform distribution) or Formula 4 (in case of Gaussian distribution) according to a distribution of AOA. Yet, as mentioned in the foregoing description, if the AOA has a different distribution, the corresponding correlation function can be used. Or, the MMSE estimation can be performed by simplifying the correlation function of Formula 3 or that of Formula 4.

And, a user equipment can calculate a difference magnitude and/or a difference angle of a channel response between an antenna belonging to the first set and an antenna belonging to the second set using a difference magnitude and/or a difference angle of a channel response between antennas belonging to the first set. By doing so, a channel response value for the antennas belonging to the second set can be finally calculated [S1607]. In particular, the difference magnitude and the difference angle of the channel response between neighboring antennas belonging to the first set can be represented by a multiple of a difference magnitude and a difference angle of a channel response between an antenna belonging to the first set and an antenna belonging to the second set. Hence, information on the difference magnitude and the difference angle of the channel response between the first set and the second set can be configured with J number of information and may be able to calculate channel responses for the antennas belonging to the second set. In the example shown in FIG. 17, a channel response for a second set #1 antenna can be calculated based on a difference magnitude and a difference angle between a channel response of a first set #1 antenna and a channel response of a first set #3 antenna, which are transmitting a reference signal, respectively. Similarly, a channel response for a second set #2 antenna can be calculated based on a difference magnitude and a difference angle between a channel response of a first set #2 antenna and a channel response of a first set #3 antenna. An identical process can be performed for the remaining antennas as well.

Having estimated channels for the M number of antennas (first set), the user equipment can report CSI for downlink to the base station [S1609]. In this case, the CSI can include at least one of CQI and PMI. Since the PMI corresponds to a precoding matrix for the M number of antennas (first set), the precoding matrix can be represented by a matrix of 'M*L' and the user equipment can select a PMI value from M Tx code book. And, since the CQI corresponds to channel quality information on the M number of antennas (first set), the CQI can be calculated using the M number of reference signals. As mentioned in the foregoing description, when the CSI for the M number of antennas (first set) is feedback, the user equipment can transmit quantized CQI and PMI or CQI and PMI, which are not quantized. In particular, in case of the PMI, information can be configured by a value of a channel response for the M number of antennas (first set) itself instead of a precoding matrix.

And, in case that the user equipment has estimated channels for the J number of antennas (second set) in the step S1605, the user equipment configures CQI and PMI for the J number of antennas (second set) and can feedback the CQI and the PMI to the base station together with the CSI for the M number of antennas (first set). In this case, the CQI and the PMI for the J number of antennas (second set) can be configured by CQI and PMI for an antenna of the first set closest to a random antenna among the J number of antennas (second set). In the example shown in FIG. 17, the CQI and the PMI for the J number of antennas (second set) indicate CQI and PMI for a first set #1 antenna and a second set #1 antenna. In particular, the CQI and the PMI are configured by 2 Tx precoding matrix and the user equipment can select PMI from 2 Tx code book. In other word, the CQI and the PMI for the second set do not mean CQI and PMI for the antennas belonging to the second set. Instead, the CQI and the PMI for the second set are configured by CQI and PMI for one or more random antennas of the second set and an antenna of the first set closest to the one or more random antennas of the second set. In this case, the PMI is configured by a precoding matrix of '(N/M)*L' and there exist M number of PMIs. The user equipment can select the PMI from (N/M) Tx code book. Yet, if spatial correlation is high, channel responses between antennas become similar to each other. Hence, if the spatial correlation is higher than a predetermined threshold (e.g., 0.7 or 0.9), the user equipment can transmit representative one or more PMIs instead of performing feedback on the M number of PMIs. This is because, since channel magnitude or angle between antennas is similar to each other, the M number of PMIs have an identical precoding matrix.

And, in case that the user equipment has calculated a difference magnitude and/or a difference angle value of a channel response between an antenna belonging to the first set and an antenna belonging to the second set adjacent to the antenna belonging to the first set in the step S1607, the user equipment can report the difference magnitude and/or the difference angle value of the channel response between the antenna belonging to the first set and the antenna belonging to the second set adjacent to the antenna belonging to the first set to the base station together with CSI for the M number of antennas (first set). Yet, since a difference magnitude and/or a difference angle value of a channel response between neighboring antennas varies according to each antenna, feedback overhead may become huge if all of the values are transmitted. Hence, one or more representative difference magnitude and/or a difference angle value can be transmitted. For instance, if spatial correlation is high, channel responses between antennas are similar to each other. As a result, a magnitude or an angle has a value similar to each other. Hence, if a spatial correlation value is higher than a predetermined threshold (e.g., 0.7 or 0.9), an average value for the difference magnitude or an average value for the difference angle is transmitted. Or, one or more representative difference magnitude and/or difference angle values between specific antennas can be transmitted. As mentioned in the foregoing description, in case of reporting a difference magnitude and/or a difference angle value of a channel response between an antenna belonging to the first set and an antenna belonging to the second set adjacent to the antenna belonging to the first set to the base station, a quantized difference magnitude and/or difference angle or a difference magnitude and/or difference angle, which is not quantized, can be transmitted to the base station.

The base station can perform beamforming in a manner of precoding a downlink channel using a precoding matrix for all antennas (N number of antennas) using the feedback information received from the user equipment [S1611]. In this case, a scheme of precoding the downlink channel can be classified as follows.

First of all, in the step S1609, if the base station receives CSI feedback on the M number of antennas (first set) only, the base station can transmit a downlink channel in a manner of precoding the downlink channel using the M number of antennas only (i.e., the antennas, which have transmitted reference signals) corresponding to the first set. Or, the base station calculates CIS information on the J number of antennas (second set) using CSI information on the M number of antennas (first set) and can perform beamforming using a (N*L) precoding matrix. In this case, as a method of calculating the CSI information on the J number of antennas (second set), it may use the aforementioned interpolation scheme or the MMSE scheme. In case of using the MMSE scheme, since it is necessary for the base station to receive an AS and AOA value from the user equipment, the user equipment can additionally feedback the AS and the AOA value to the base station.

In the step S1609, if the base station receives CSI feedback on the M number of antennas (first set) and receives CQI and PMI feedback on the J number of antennas (second set), the base station can calculate PMI for the N number of antennas via Knonecker product calculation as shown in Formula 7 in the following.

$$W = W_1 \otimes W_2 \quad \text{[Formula 7]}$$

($W_1$: Precoding matrix for 1 set, $W_2$: Precoding matrix for 2 set)

For instance, when 4 antennas, which transmit a reference signal with an interval of two antennas out of a total 8 antennas, are configured (the number of layer=1), if a user equipment reports first PMI (precoding matrix $W_1=[1\ j\ -j\ -1]^T$ according to the first PMI) and second PMI (precoding matrix $W_2=[1\ -1]^T$ according to the second PMI) to a base station, the base station can calculate a precoding matrix (W=[1 −1 j −j −j j −1 1]) for the total 8 antennas using the Formula 7 mentioned above. Having calculated the PMI for the N number of antennas via the Formula 7, the base station can perform beamforming for a downlink channel using a (N*L) precoding matrix.

In the step S1609, if the base station receives CSI of an antenna belonging to the first set, feedback on difference magnitude and/or difference angle value between neighboring antennas belonging to the first set or feedback on difference magnitude and/or difference angle value of a representative channel response of the first set, the base station can calculate CSI on the J number of antennas (second set) using the received CSI on the first set and the difference magnitude and/or difference angle value. The CSI on the second set can be calculated using Formula 8 in the following. By doing so, beamforming for a downlink channel can be performed using a (N*L) precoding matrix. In Formula 8, i may indicate an $i^{th}$ antenna belonging to the first set or an $i^{th}$ antenna belonging to the second set.

$$2 \text{ set } i \text{ th antenna } CSI = 1 \text{ set } i \text{ th antenna } CSI + \alpha \angle \theta \quad \text{[Formula 8]}$$

($\alpha$: difference magnitud, $\theta$: difference angle, i≤number of antennas of 2set)

The Generals of Device to which the Present Invention is Applicable

Figure 18:
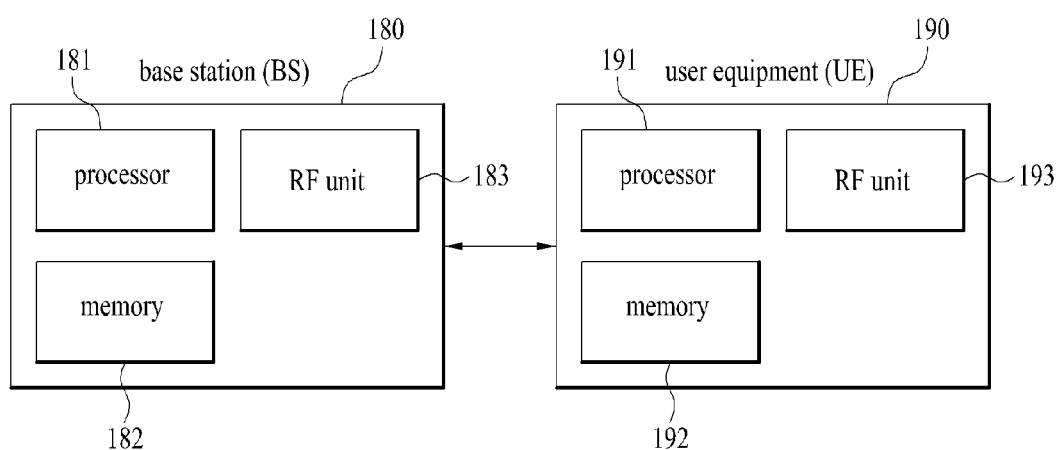
FIG. 18 is a block diagram for an example of a wireless communication device according to one embodiment of the present invention.

FIG. 18 is a block diagram for an example of a wireless communication device according to one embodiment of the present invention.

Referring to FIG. 18, a wireless communication system includes a base station 180 and a plurality of user equipments 190 positioned within a region of the base station 180.

The base station 180 includes a processor 181, a memory 182 and a radio frequency (RF) unit 183. The processor 181 implements a proposed function, a procedure and/or a method. Layers of a wireless interface protocol can be implemented by the processor 181. The memory 182 is connected with the processor 181 and store various information necessary for driving the processor 181. The RF unit 183 is connected with the processor 181 and transmits and/or receives a radio signal.

A user equipment 190 includes a processor 191, a memory 192 and a radio frequency (RF) unit 193. The processor 191 implements a proposed function, a procedure and/or a method. Layers of a wireless interface protocol can be implemented by the processor 191. The memory 192 is connected with the processor 191 and store various information necessary for driving the processor 191. The RF unit 193 is connected with the processor 191 and transmits and/or receives a radio signal.

The memory 182/192 may be installed inside or outside of the processor 181/191 and can be connected with the processor 181/191 with well-known means. And, the base station 180 and/or the user equipment 190 may have a single antenna or multiple antennas. In particular, the base station and the user equipment according to the present invention can be implemented to support the aforementioned massive MIMO system.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although various embodiments according to the present invention are explained centering on an example applied to 3GPP LTE system, the embodiments of the present invention can be identically applied to various wireless access systems as well as 3GPP LTE system.

What is claimed is:

1. A method of performing downlink beamforming in a wireless access system, comprising the steps of:
   transmitting, by a base station, a reference signal to a user equipment via a first antenna set;
   receiving, by the base station, channel state information (CSI) on the first antenna set from the user equipment; and
   transmitting, by the base station, a downlink channel to the user equipment in a manner of beamforming the downlink channel using a precoding matrix for the first antenna set and a second antenna set,
   wherein CSI on the second antenna set, which has not transmitted the reference signal, is calculated using the CSI on the first antenna set, and
   wherein the CSI on the second antenna set is calculated in a manner of applying an interpolation scheme or an MMSE (Minimum Mean Square Estimation) scheme to the CSI on the first antenna set.

2. The method of claim 1, wherein the CSI on the second antenna set is calculated by the base station or the user equipment.

3. The method of claim 1, further comprising the step of receiving, by the base station, a difference magnitude value and a difference angle value of a channel response between a random antenna among antennas belonging to the first antenna set and an antenna closest to the random antenna, from the user equipment.

4. The method of claim 3, wherein the CSI on the second antenna set is calculated using the CSI on the first antenna set, the difference magnitude value and the difference angle value.

5. The method of claim 1, wherein the CSI comprises at least one of CQI (Channel Quality Information) and PMI (Precoding Matrix Indication).

6. A method of performing downlink beamforming in a wireless access system, comprising the steps of:
   receiving, by a user equipment, a reference signal via a first antenna set of a base station;
   transmitting, by the user equipment, channel state information (CSI) on the first antenna set to the base station; and
   receiving, by the user equipment, a downlink channel on which beamforming is performed using a precoding matrix for the first antenna set and a second antenna set from the base station,
   wherein CSI on the second antenna set, which has not transmitted the reference signal, is calculated using the CSI on the first antenna set, and
   wherein the CSI on the second antenna set is calculated in a manner of applying an interpolation scheme or an MMSE (Minimum Mean Square Estimation) scheme to the CSI on the first antenna set.

7. The method of claim 6, wherein the CSI on the second antenna set is calculated by the base station or the user equipment.

8. The method of claim 6, further comprising the step of transmitting, by the user equipment, a difference magnitude value and a difference angle value of a channel response between a random antenna among antennas belonging to the first antenna set and an antenna closest to the random antenna, to the base station.

9. The method of claim 8, wherein the CSI on the second antenna set is calculated using the CSI on the first antenna set, the difference magnitude value and the difference angle value.

10. The method of claim 6, wherein the CSI comprises at least one of CQI (Channel Quality Information) and PMI (Precoding Matrix Indication).

11. A base station performing downlink beamforming in a wireless access system, comprising:
   a radio frequency (RF) unit configured to transmit and receive a radio signal; and
   a processor, the processor configured to transmit a reference signal to a user equipment via a first antenna set only among all antennas of the base station, the processor configured to receive channel state information (CSI) on the first antenna set from the user equipment, the processor configured to transmit a downlink channel to the user equipment in a manner of beamforming the downlink channel using a precoding matrix for the first antenna set and a second antenna set,
   wherein CSI on the second antenna set, which has not transmitted the reference signal, is calculated using the CSI on the first antenna set, and
   wherein the CSI on the second antenna set is calculated in a manner of applying an interpolation scheme or an MMSE (Minimum Mean Square Estimation) scheme to the CSI the first antenna set.

12. A user equipment supporting downlink beamforming of a base station in a wireless access system, comprising:
   a radio frequency (RF) unit configured to transmit and receive a radio signal; and
   a processor, the processor configured to receive a reference signal via a first antenna set only, the processor configured to transmit channel state information (CSI) on the first antenna set to the base station, the processor configured to receive a downlink channel on which beamforming is performed using a precoding matrix for the first antenna set and a second antenna set from the base station,
   wherein CSI on the second antenna set, which has not transmitted the reference signal, is calculated using the CSI on the first antenna set, and
   wherein the CSI on the second antenna set is calculated in a manner of applying an interpolation scheme or an MMSE (Minimum Mean Square Estimation) scheme to the CSI on the first antenna set.

* * * * *